United States Patent
Matsuo et al.

(10) Patent No.: US 10,531,450 B2
(45) Date of Patent: Jan. 7, 2020

(54) COMMUNICATION PROCESSING DEVICE, AND WIRELESS COMMUNICATION METHOD

(71) Applicant: KABUSHIKI KAISHA TOSHIBA, Minato-ku (JP)

(72) Inventors: Ryoko Matsuo, Shinagawa (JP); Toshihisa Nabetani, Kawasaki (JP); Toshiyuki Nakanishi, Yokohama (JP); Hirokazu Tanaka, Bunkyo (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 820 days.

(21) Appl. No.: 15/057,446

(22) Filed: Mar. 1, 2016

(65) Prior Publication Data

US 2016/0183258 A1 Jun. 23, 2016

Related U.S. Application Data

(63) Continuation of application No. PCT/JP2014/073247, filed on Sep. 3, 2014.

(30) Foreign Application Priority Data

Sep. 3, 2013 (JP) .................... 2013-182543

(51) Int. Cl.
*H04W 72/04* (2009.01)
*H04W 74/00* (2009.01)
(Continued)

(52) U.S. Cl.
CPC ....... *H04W 72/0446* (2013.01); *H04W 72/02* (2013.01); *H04W 72/042* (2013.01);
(Continued)

(58) Field of Classification Search
CPC .............. H04W 76/15; H04W 74/002; H04W 72/0446; H04W 74/006; H04W 72/042; H04W 72/02
See application file for complete search history.

(56) References Cited

U.S. PATENT DOCUMENTS 8,310,996 B2 11/2012 Nanda et al.
8,605,663 B2 12/2013 Tanno et al.
(Continued)

FOREIGN PATENT DOCUMENTS

JP 2006-352191 A 12/2006
JP 2007-116639 A 5/2007
(Continued)

OTHER PUBLICATIONS

Chen Xun, Han Peng, ,He Qiu-sheng, Tu Shi-liang, Chen Zhang-long, A Multi-Channel MAC Protocol for Wireless Sensor Networks, Proceedings of The Sixth IEEE International Conference on Computer and Information Technology, pp. 1-6, 2006 (Year: 2006).*
(Continued)

*Primary Examiner* — Christopher M Crutchfield
(74) *Attorney, Agent, or Firm* — Oblon, McClelland, Maier & Neustadt, L.L.P.

(57) ABSTRACT

According to one embodiment, a communication processing device mounted in a wireless communication device which uses a first channel and a second channel, includes controlling circuitry. The circuitry is configured to control to transmit, through the first channel, a first announcement signal including channel information of the second channel and control to transmit, through the second channel, a second announcement signal when slot allocation of a target communication device in the second channel is determined
(Continued)

to be changed, the second announcement signal including a notification of the change in the slot allocation of the target communication device.

14 Claims, 25 Drawing Sheets

(51) Int. Cl.
*H04W 72/02* (2009.01)
*H04W 76/15* (2018.01)
*H04W 84/10* (2009.01)

(52) U.S. Cl.
CPC ......... *H04W 74/006* (2013.01); *H04W 76/15* (2018.02); *H04W 84/10* (2013.01); *Y02D 70/00* (2018.01); *Y02D 70/142* (2018.01); *Y02D 70/144* (2018.01); *Y02D 70/168* (2018.01); *Y02D 70/26* (2018.01)

(56) References Cited

U.S. PATENT DOCUMENTS

| | | | |
|---|---|---|---|
| 2007/0253391 A1* | 11/2007 | Shao | H04W 74/04 370/338 |
| 2007/0287384 A1 | 12/2007 | Sadri et al. | |
| 2009/0117853 A1 | 5/2009 | Ishii et al. | |
| 2010/0128805 A1 | 5/2010 | Tanno et al. | |
| 2011/0007672 A1 | 1/2011 | Park et al. | |
| 2011/0075621 A1* | 3/2011 | Sung | H04W 48/12 370/329 |
| 2011/0270984 A1* | 11/2011 | Park | H04W 4/00 709/225 |
| 2013/0051388 A1* | 2/2013 | Pantelidou | H04L 1/0002 370/390 |

FOREIGN PATENT DOCUMENTS

| | | |
|---|---|---|
| JP | 2007-336493 A | 12/2007 |
| JP | 2009-540765 A | 11/2009 |
| JP | 2012-533261 A | 12/2012 |
| JP | 2013-17198 A | 1/2013 |
| WO | WO 2007/083555 A1 | 7/2007 |

OTHER PUBLICATIONS

International Preliminary Report on Patentability and Written Opinion of the International Searching Authority dated Mar. 17, 2016 in PCT/JP2014/073247, Filed Sep. 3, 2014.

International Search Report dated Oct. 28, 2014 in PCT/JP2014/073247 Filed Sep. 3, 2014.

802.15.6-2012,—"IEEE Standard for Local and metropolitan area networks—Part 15.6: Wireless Body Area Networks," The Institute of Electrical and Electronics Engineers, Inc., 2012 (271 pages).

Kubo, et al., "Interference avoidance based on channel switching for large scale wireless sensor networks," The Institute of Electronics, Information and Communication Engineers, 2011 (6 pages) with English Abstract.

Fujiura, et al., "A Study on MAC Protocol Guaranteed Delay of Medical Information for BAN," Proceedings of the 33rd Symposium on Information Theory and its Applications, 2010 (10 pages) with English Abstract.

"Signaling for TDD UL-DL Reconfiguration" Samsung, Internet URL: http://www.3gpp.org/ftp/tsg_ran/WG1_RL1/TSGR1_72b/Docs/R1-131012.zip, 3GPP TSG RAN WG1 Meeting #72bis, R1-131012, Apr. 15-19, 2013, 4 Pages.

* cited by examiner

CONTROL CHANNEL BEACON FORMAT

| Sender Address | Dch Beacon Period | MAC Capability | PHY Capability | Cch/Dch Number | Dch Beacon Period | Dch Beacon timing (elapsed time) | Dch offset timing |

DATA CHANNEL BEACON FORMAT

| Sender Address | Dch Beacon Period | Dch Number of allocation slots | Downlink Allocation information | Allocation Change information |

FIG. 4

(1) CONNECTION REQUEST SIGNAL (2) CONNECTION RESPONSE SIGNAL

COMMUNICATION PROCESSING DEVICE, AND WIRELESS COMMUNICATION METHOD

CROSS REFERENCE TO RELATED APPLICATIONS

This application is a Continuation of International Application No. PCT/JP2014/073247, filed on Sep. 3, 2014, the entire contents of which is hereby incorporated by reference.

FIELD

Embodiments described herein relate to a communication processing device, an integrated circuit, a wireless communication terminal, a memory card, a wireless communication device, and a wireless communication method.

BACKGROUND

A network called a body area network is known as a wireless network formed on a human body. The IEEE committee standardizes the body area network, and IEEE 802.15.6 specifications are established. In the body area network, a hub as a central device and a node as a terminal device are mounted in the human body, and communication is performed between the hub and the node, for example.

An access scheme of IEEE 802.15.6 uses a mechanism of temporally sharing a TDMA (Time Division Multiple Access)-based access scheme and a CSMA (Carrier Sense Multiple Access)-based or slot ALOHA-based access scheme on the same frequency.

Meanwhile, a mechanism of separately providing a control channel and a data channel and using the CSMA-based access scheme in the channels is examined as an access technique for supporting asynchronous ad hoc communication. However, all control frames are transmitted and received through the control channel, and it is essential that the hub and the node always monitor the control channel at timing other than data transmission and reception through the data channel.

An access scheme using a plurality of control channels and data channels is also examined, and transmission of the same beacon signal at the same timing in all channels is stipulated.

In this way, the conventional IEEE 802.15.6 system uses the mechanism of temporally sharing a plurality of access schemes on the same frequency, and there is a problem that the power consumption is large due to the complexity of the system. In the two access techniques using the control channel and the data channel, both of the hub and the node basically need to always monitor both of the channels or at least the control channel, and there is a problem in terms of the power consumption.

BRIEF DESCRIPTION OF THE DRAWINGS

FIG. 4 is a diagram showing an example of frame format of a beacon signal of a control channel and a beacon signal of a data channel according to the first embodiment;

DETAILED DESCRIPTION

An embodiment of the invention is to reduce power consumption of a wireless communication device.

According to one embodiment, a communication processing device mounted in a wireless communication device which uses a first channel and a second channel, includes controlling circuitry. The circuitry is configured to control to transmit, through the first channel, a first announcement signal including channel information of the second channel and control to transmit, through the second channel, a second announcement signal when slot allocation of a target communication device in the second channel is determined to be changed, the second announcement signal including a notification of the change in the slot allocation of the target communication device.

Embodiments of the present invention will now be described with reference to the drawings.

First Embodiment

Figure 1:
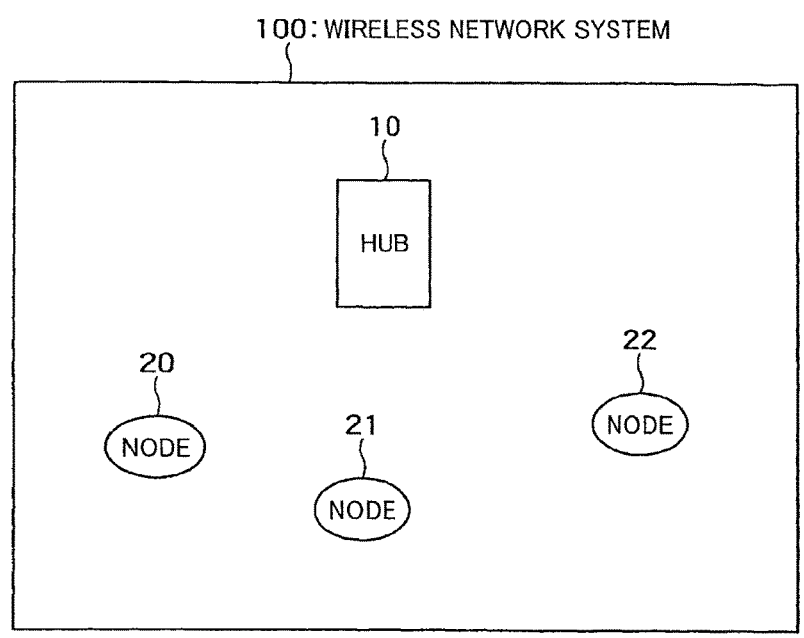
FIG. 1 is a diagram showing an example of a wireless network system according to a first embodiment.

FIG. 1 shows an example of a wireless network system according to a first embodiment. A wireless network system 100 shown in FIG. 1 includes a hub 10 and a plurality of nodes 20, 21, and 22. The hub 10 includes a wireless communication device operating as a central device. Each node includes a wireless communication device operating as a terminal for the central device. The wireless communication device of the hub 10 is a target communication device for the nodes 20, 21, and 22, and the wireless communication devices of the nodes 20, 21, and 22 are target communication devices for the hub 10.

Each node includes, for example, one or a plurality of sensors and wirelessly transmits sensing information acquired by the sensors to the hub 10. Each node wirelessly receives control information and the like necessary for communication from the hub. In a body area network, the nodes and the hub are mounted in a human body. The mounting on the human body may include any cases of arrangement at positions close to the human body, such as a form of direct contact with the human body, a form of mounting from outside of clothes, a form of providing on a string hanging from the neck, and a form of accommodating in a pocket. Examples of the sensors include biological sensors, such as a sleep sensor, an acceleration sensor, an electrocardiogram sensor, a temperature sensor, and a pulse sensor. However, the present embodiment is not limited to the body area network, and an arbitrary network can be constructed as long as the hub and the nodes can be arranged. For example, the hub and the nodes may be installed on a living body other than the human body, such as an animal and a plant, or may be installed on an object other than the living body, such as a plurality of parts of an automobile (for example, a body and a wheel).

Figure 2:
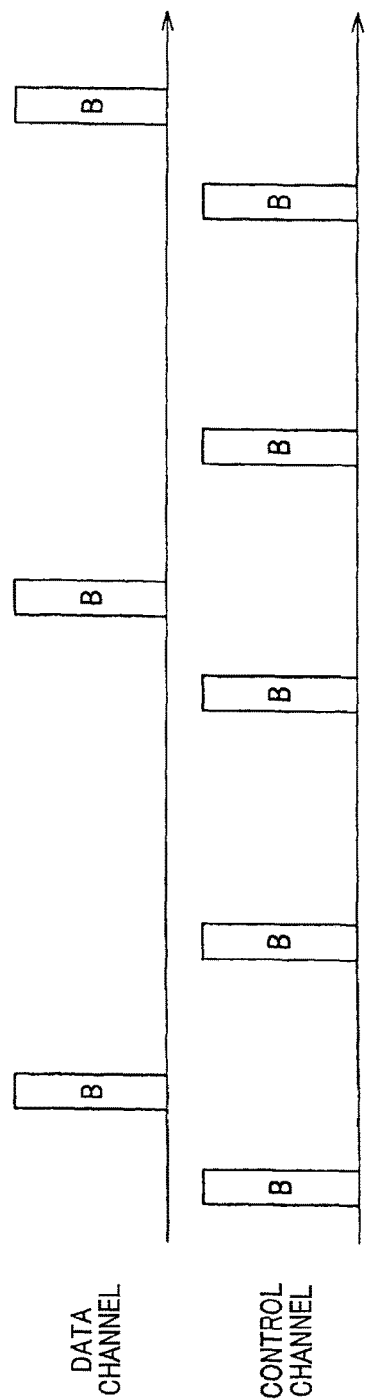
FIG. 2 is a timing diagram of a hub according to the first embodiment.
Figure 3:
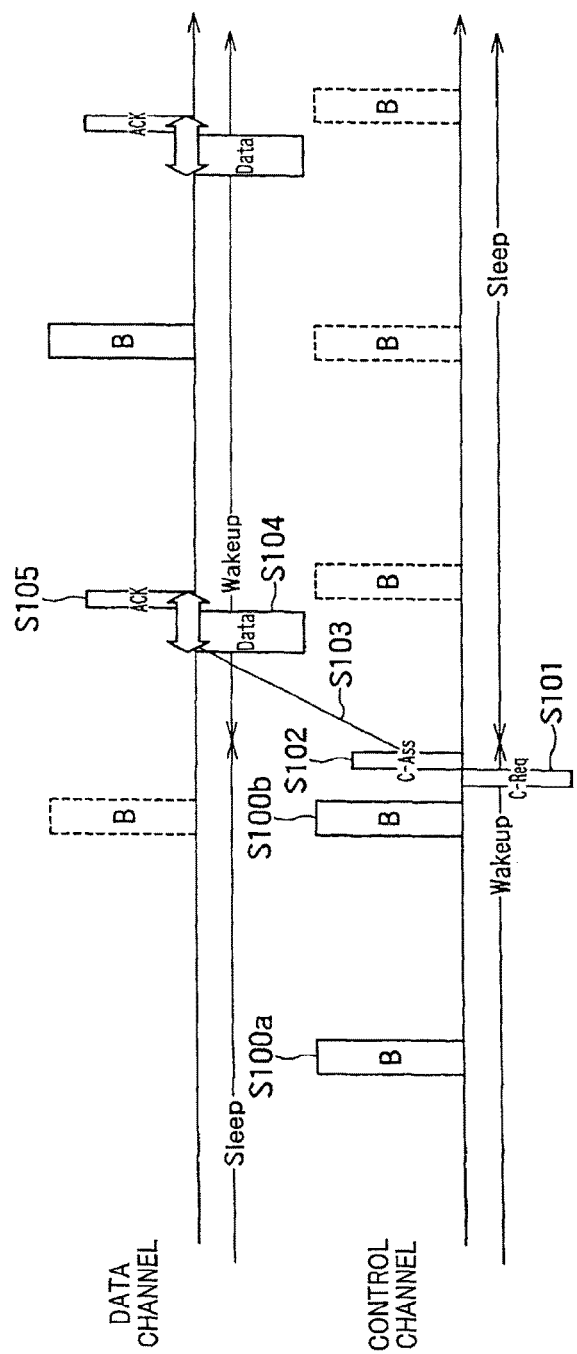
FIG. 3 is a timing diagram of a node according to the first embodiment.

FIG. 2 shows a timing diagram of the hub according to the first embodiment. FIG. 3 shows a timing diagram of the node according to the first embodiment. Beacon transmission timing of a data channel is different in examples shown in FIGS. 2 and 3.

The hub and the node use a control channel equivalent to a first channel (may be written as "Cch") and the data channel equivalent to a second channel (may be written as "Dch") to perform transmission and reception. Although the control channel and the data channel belong to, for example, different frequency bands, the control channel and the data channel may belong to the same frequency band. In the case illustrated in the following description, the control channel and the data channel belong to different frequency bands. Communication of CSMA (Carrier Sense Multiple Access) is performed in the control channel, and communication of TDMA (Time Division Multiple Access) is performed in the data channel, for example (i.e., an access method is different between the control channel and the data channel). This case will be illustrated below. Although one control channel and one data channel are provided in the present embodiment, a plurality of control channels and/or a plurality of data channels may exist.

As shown in FIG. 2, the hub transmits announcement signals (hereinafter, beacon signals) through the control channel and the data channel, and the signals include different information. Vertically long rectangles with character "B" in FIG. 2 indicate transmission of the beacon signals. The horizontal axis is a time axis. Although the beacon signals are generally transmitted by broadcast, the beacon signals can also be transmitted by multicast.

The beacon signal of the control channel includes at least a channel number (hereinafter, channel No.) that is an identifier of the channel used in the control channel and the data channel. The channel No. is a value for identifying the frequency band, and the node can specify the frequency band if the node recognizes the channel No. As a result, once the node receives the beacon signal transmitted by the hub through the control channel, the node can specify the channel No. of the data channel used by the hub. The node can receive the beacon signal and transmit and receive data frames through the data channel designated by the hub.

The beacon signal of the control channel may include at least one of beacon intervals of the data channel and information that can estimate next beacon timing of the data channel. As a result, once the node receives the beacon signal through the control channel, the node can recognize the timing of the beacon signals transmitted through the relevant data channel, along with the channel No. of the data channel. Therefore, power consumption can be reduced by starting a reception waiting process a little before the timing.

When the intervals of the beacon signals of the data channel are longer than the beacon signal intervals of the control channel, the node usually needs to continue waiting for the reception of the beacon signals through the data channel for a long period. However, if the beacon signals of the control channel include the information that can estimate the timing of the beacon signals as described above, the node does not have to wait for the reception until just before the reception timing, and the node can reduce the power consumption.

As shown in FIG. 3 that is a timing diagram of the node, the node basically performs operation of receiving the beacon signals transmitted by the hub through the control channel (S100a and S100b). The node can receive the beacon signals to specify the channel No. of the data channel, the beacon signal timing of the data channel, and the like.

At the start, the node sets the control channel as an operation channel, and when transmission data is newly generated in the node or when a request for connection with the hub is input from an upper layer of a protocol stack, the node uses the relevant control channel to execute a process of connection with the hub. Although it is assumed here that the node knows in advance the channel No. of the control channel to be used, the node may detect the channel No. by channel search or the like. In FIG. 3, the node transmits a connection request signal (C-Req) through the control channel (S101) and receives a connection response signal (C-Ass) from the hub through the control channel (S102). In this way, the node executes the process of connection with the hub. Details of the connection process using the connection request signal (C-Req) and the connection response signal (C-Ass) will be described in a third embodiment.

The node can specify time (slots) of the data channel allocated to itself from the relevant connection response signal. One or a plurality of slots are allocated. When a plurality of slots are allocated, the allocated slots may be temporally continuous or may be discrete.

After the connection process, the node changes the operation channel from the control channel to the data channel (S103). In the data channel, the node basically transmits and receives data frames and response frames (such as Ack frames) to and from the hub at the timing of the slots allocated to itself (S104 and S105). Rectangles of "Data" in FIG. 3 indicate transmission of the data frames, and rectangles of "Ack" indicate reception of the response frames.

The node activates (turns on) the control channel until the completion of the connection process, and at the completion of the connection process, the node puts the control channel into sleep (turns off the control channel) and activates the data channel. In this way, only one of the control channel and the data channel is operated at certain timing. In FIG. 3, "Wakeup" indicates that the channel is operating in a range indicated by a line with arrows, and "Sleep" indicates that the channel is not operating in a range indicated by a line with arrows. The node does not receive the beacon signals through the channel when the channel is not in operation. In FIG. 3, rectangles with dashed lines indicate beacon signals not received because the node is sleeping.

Although the data channel is always activated in the node after the completion of the connection process in the example illustrated in FIG. 3, the allocation slots of the data channel and the timing of the beacon signals of the data channel can be specified, and it is only necessary that the data channel is activated before and after the timing. Therefore, the data channel may be actually put into sleep operation at other times.

Although FIG. 3 illustrates a mechanism of executing the connection process in the control channel, the node may execute the connection process in the data channel by changing the operation channel from the control channel to the data channel based on the data channel information written in the beacon signal after the reception of the beacon signal of the control channel. In this case, the node uses an available time in the data channel to execute a connection request signal (C-Req) transmission and connection response signal (C-Ass) reception process.

As shown in FIGS. 2 and 3, although the hub transmits the beacon signals through the control channel and the data channel, transmission frequencies are different, and information included in each beacon signal is also different.

As can be understood from FIGS. 2 and 3, the node basically operates in the data channel and puts the control channel into sleep after the end of the connection process. It can be assumed that the data channel basically operates for a long time (for example, almost all the time before the termination of connection). Therefore, in terms of time ratio, the time that the operation channel is set to the data channel can be overwhelmingly longer than the time that the operation channel is set to the control channel. Thus, an increase in the power consumption in the data channel is prevented by reducing the amount of information as much as possible in the beacon signals of the data channel and reducing the transmission frequency.

On the other hand, the node that intends to newly connect to the hub needs to check the beacon signals of the control channel to start the connection process, and the beacon signals of the control channel need to be transmitted at a high frequency on some level. Therefore, it is desirable to set a high transmission frequency for the beacon signals of the control channel. For example, it is desirable to set the transmission frequency of the beacon signals of the control channel higher than the transmission frequency of the beacon signals of the data channel. However, the transmission frequency of the beacon signals of the data channel can be set to the same transmission frequency as that of the beacon signals of the control channel, or the transmission frequency of the beacon signals of the data channel can be higher than the transmission frequency of the beacon signals of the control channel.

FIG. 4 shows an example of frame format of the beacon signal of the control channel and the beacon signal of the data channel according to the present embodiment. FIG. 4 just illustrates an example, and the format is not limited to this. For example, the order of insertion of the information and the like included in the frames may be changed, and the frames may include other information. Alternatively, part of the illustrated information may not be included.

As can be understood from FIG. 4, the amount of information of the beacon signal of the data channel is smaller than that of the beacon signal of the control channel. As a result, the signal length of the beacon signal of the control channel is shorter than that of the beacon signal of the data channel. This is because information such as "MAC capability" and "PHY capability" included in the beacon signal or the like of a conventional wireless LAN or IEEE 802.15.6 is transmitted by the beacon signal of the control channel and not included in the beacon signal of the data channel. In this way, the amount of transmission of information is reduced as much as possible in the beacon signal of the data channel. Only information indicating how many of all the slots are already allocated is written in the allocation information of the slots in the data channel included in the beacon signal of the data channel, and individual allocation information of each node is not inserted. In this way, the amount of information of the beacon signal of the data channel is reduced.

However, it is just an example that the amount of information of the beacon signal of the data channel is smaller than that of the beacon signal of the control channel. The amount of information of the beacon signal of the data channel may be greater than that of the beacon signal of the control channel, or the amounts of information may be the same. In this case, the transmission frequency of the beacon signal of the data channel can be set to the same transmission frequency as that of the beacon signal of the control channel as described above.

Fields of downlink allocation information ("Downlink allocation information") and allocation change information ("Allocation change information") are provided in the frame of the beacon signal of the data channel to notify, to the node, a notification of generation of downlink data for the node and determination of allocation change of slot in the data channel. Each of the fields has a bit width equivalent to the number of nodes. Each node can check the status of the bit position addressed to itself to determine presence or absence of the downlink data for the node and presence or absence of the slot allocation change request. Details of the fields will be described in a fourth embodiment.

When each node transmits sensing information of the mounted sensor to the hub, uplink data from the node to the hub is usually transmitted at the timing of the allocation slot. To transmit downlink data from the hub to the node, the allocation of the slot needs to be changed, and the "Downlink allocation information" field is used in this case. The "Downlink allocation information" and the "Allocation change information" may independently exist in two fields, or the fields may be integrated into one field.

In this way, the amount of information of the beacon signal of the data channel can be reduced to reduce the reception processing load of the node.

On the other hand, the transmission frequency of the beacon signals of the data channel and the estimation information for estimating the next beacon signal timing of the data channel are inserted to the beacon signal of the control channel, in addition to the channel Nos. of the control channel and the data channel, as described above. In the example of the beacon signal frame format of the control channel shown in FIG. 4, a data channel beacon period ("Dch Beacon Period") or information for calculating the relevant data channel beacon period is inserted as the transmission frequency, and data channel beacon timing ("Dch Beacon timing") and data channel offset timing ("Dch offset timing") are inserted as the estimation information.

Figure 5:
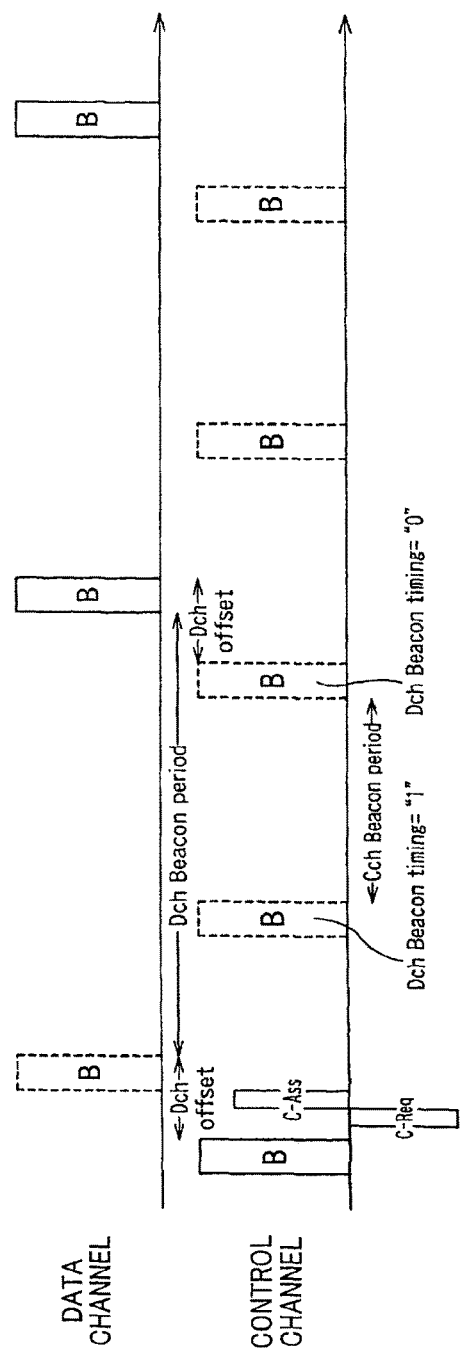
FIG. 5 is an explanatory diagram of data channel beacon timing and data channel offset timing according to the first embodiment.

FIG. 5 is an explanatory diagram of the data channel beacon timing ("Dch Beacon timing") and the data channel offset timing ("Dch offset timing").

The data channel offset timing (written as "Dch offset" in FIG. 5) indicates a difference between the timing of the beacon signal of the control channel and the timing of the beacon signal of the data channel temporally closest to the beacon signal of the control channel.

The data channel beacon timing indicates the number of times that the beacon signal of the control channel is transmitted before the next transmission of the beacon signal of the data channel. In the example shown in FIG. 5, the beacon signals of the control channel and the beacon signals of the data channel are transmitted at a ratio of two beacon signals of the control channel to one beacon signal of the data channel. Therefore, the value of the data channel beacon timing is "1" or "0" according to the transmission timing of the beacon. More specifically, when the value of the data channel beacon timing is "1", the beacon signal of the data channel will be transmitted after the beacon signal of the control channel is transmitted one more time. When the value of the data channel beacon timing of the data channel is "0", the beacon signal of the data channel will be transmitted before next transmission of the beacon signal of the control channel. The ratio of the transmission frequencies of the beacon signals of the control channel and the beacon signals of the data channel may be a ratio other than the ratio in the illustrated example.

Although one control channel and one data channel are provided in the present embodiment, a plurality of control channels and/or a plurality of data channels may exist. Although only one data frame and the response frame for the data frame are transmitted and received in the slot period allocated to the node in the example illustrated in the timing diagram of the node shown in FIG. 3, transmission of a plurality of data frames and reception of response frames for the data frames may be performed in the relevant period.

Figure 6:
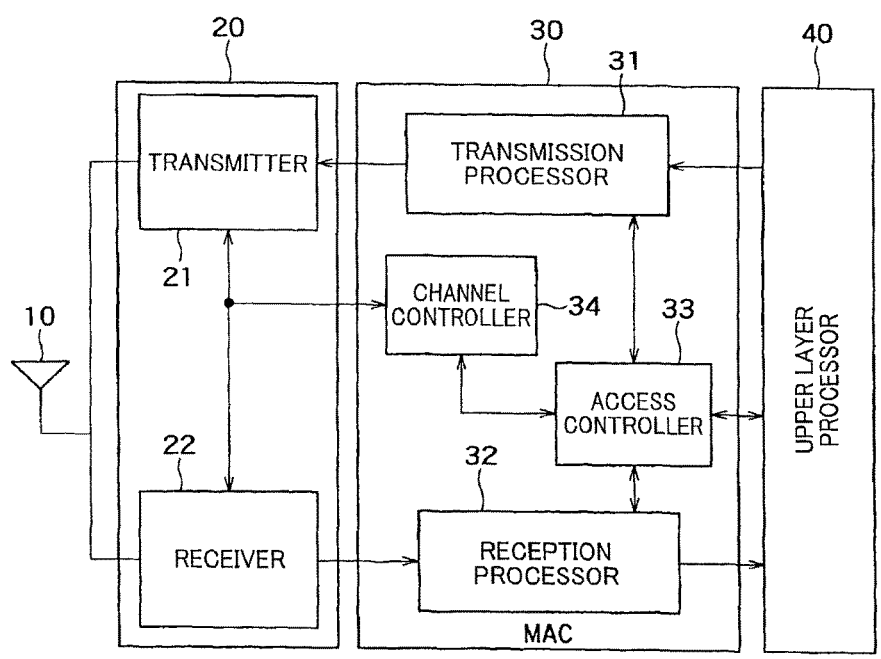
FIG. 6 is a block diagram of a wireless communication device in the hub according to the first embodiment.

FIG. 6 shows an example of configuration of the hub including the wireless communication device of the present embodiment. The hub includes an antenna 10, a PHY & RF unit 20, a MAC unit 30 that is a communication processing device or controlling circuitry according to the present embodiment, and an upper layer processor 40. The PHY & RF unit 20 includes a transmitter 21 and a receiver 22. The MAC unit 30 includes a transmission processor 31, a reception processor 32, an access controller 33, and a channel controller 34.

The access controller 33 manages access to the control channel and the data channel and controls the transmission of the beacon signals in each channel at desired timing. When the access controller 33 instructs the transmission processor 31 to transmit the beacon signal of the control channel or the data channel, the transmission processor 31 generates a frame of the beacon signal of the control channel or the data channel and outputs the generated frame to the transmitter 21. The beacon signal of the control channel includes channel information (channel No. and the like) of the data channel.

The transmitter 21 performs transmission in the control channel and transmission in the data channel. The receiver 22 performs reception in the control channel and reception in the data channel. The transmitter 21 is set to channels with channel Nos. instructed from the channel controller 34 described later to perform the transmission in the relevant channels. The receiver 22 is set to channels with channel Nos. instructed from the channel controller 34 described later to perform the reception in the relevant channels.

The beacon signal frame of the control channel is transmitted through the control channel, and the beacon signal frame of the data channel is transmitted through the data channel. The data frame is transmitted through the data channel as described later. The frame reception of the control channel is performed in a state that the receiver 22 is set for the control channel, and the frame reception of the data channel is performed in a state that the receiver is set for the control channel.

The transmitter 21 applies desired processing of physical layer to the frames inputted from the transmission processor 31 according to respective communication schemes to perform D/A conversion, frequency conversion, and the like and transmits signals as radio waves to a space through the antenna 10.

The receiver 22 receives the signals through the antenna 10 to apply reception processing to the signals and outputs the processed frames to the reception processor 32. Examples of the reception processing include frequency conversion to baseband, A/D conversion, analysis of a physical header of the frame after the A/D conversion, a demodulation process, and other desired physical layer processing.

The channel controller 34 controls the setting of the PHY & RF unit 20, that is, the setting of the transmitter 21 and the receiver 22. For example, the channel controller 34 transmits the channel Nos. of the channels to be used to the PHY & RF unit 20 according to an instruction from the access controller 33, and the PHY & RF unit 20 sets the channels to be used in the transmitter 21 and the receiver 22. When transmitters-receivers are prepared in two systems for the data channel and the control channel, the channels may not be switched, and the transmitters-receivers can be independently operated. In this case, an antenna is arranged for each communicator (transmitter and receiver). The channel controller 34 can notify operation channel information designating the channel to be used (data channel or control channel) to the PHY & RF unit according to an instruction from the access controller 33 to thereby switch the operation of the data channel and the control channel.

The reception processor 32 performs analysis or the like of a MAC header of the frame input from the receiver 22. When the reception processor 32 receives a connection request signal frame from the node, the reception processor 32 notifies a connection request from the node to the access controller 33. The access controller 33 determines a response for the allocation for the relevant connection request and notifies a determination result to the transmission processor 31. For example, the access controller 33 determines the time (slots) to be allocated to the node, that is, the number of slots and the positions of the slots. The transmission processor 31 generates a frame of connection response signal according to the determination result of the access controller 33. When the connection request signal from the node includes a sensor type handled by the node or information similar to the sensor type, the access controller 33 may notify the relevant information to the upper layer processor 40. The upper layer processor 40 may determine the number of allocation slots for the node based on the relevant information. In this case, the upper layer processor 40 notifies the information of the determined number of allocation slots to the access controller 33, and the access controller 33 allocates the slots based on the notified information of the number of allocation slots and the like. The access controller 33 causes the transmission processor 30 to generate a frame of the connection response signal including the allocation information of the slots and transmits the frame from the transmitter 21 to the node through the control channel.

When the received frame input from the receiver 22 in which the MAC header of the frame is analyzed is a data frame, the reception processor 32 outputs the processed frame to the upper layer processor 40 as necessary.

When there is downlink data to be individually transmitted to the node, the upper layer processor 40 notifies a data frame including the data to the transmission processor 31. The access controller 33 instructs the transmission processor 31 to transmit the data frame to the node in a downlink slot secured by an arbitrary method (for example, method using a beacon signal of the data channel or the control channel). The transmission processor 31 applies a MAC header addition process or the like to the relevant frame and outputs the processed frame to the transmitter 21. The transmitter 21 transmits the frame input from the transmission processor 31 through the data channel. Specifically, the transmission processor 31 applies desired physical layer processing, such as demodulation process and physical header addition, to the relevant frame. The transmission processor 31 applies D/A conversion or frequency conversion to the processed frame and radiates the signal as a radio wave to the space through the antenna 10.

Figure 7:
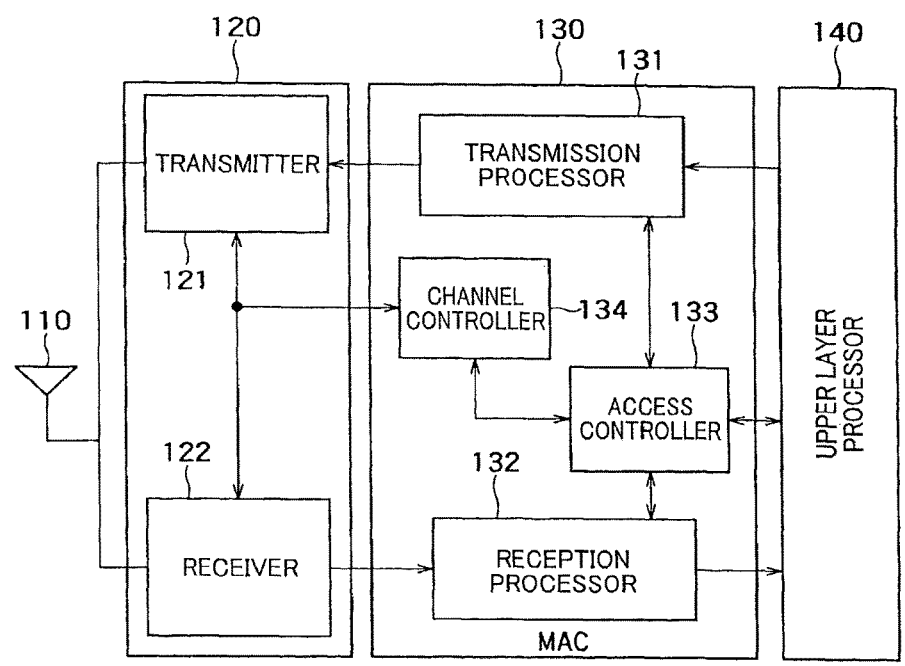
FIG. 7 is a block diagram of a wireless communication device in the node according to the first embodiment.

FIG. 7 shows an example of configuration of the node including the wireless communication device of the present embodiment. The node includes an antenna 110, a PHY &RF unit 120, a MAC unit 130 that is a communication processing device according to the present embodiment, and an upper layer processor (sensor controller) 140. The PHY & RF unit 120 includes a transmitter 121 and a receiver 122. The MAC unit 130 includes a transmission processor 131, a reception processor 132, an access controller 133, and a channel controller 134.

The upper layer processor (sensor controller) 140 outputs a transmission request for connection with the hub to the access controller 133 at predetermined timing, such as at the start or at the generation of transmission data. The upper layer processor 140 generates a frame including transmission data, such as sensing information, and outputs the frame to the transmission processor 131. The transmission processor 131 may include a transmission buffer that holds the frame input from the upper layer processor 140. Alternatively, the transmission buffer may be provided in a front stage of the transmission processor 131 as described later. The transmission processor 131 outputs the data frame to the transmitter 121 according to an instruction of the access controller 133 (described later).

Examples of the transmission data include sensing information acquired by a sensor such as a biological sensor, data indicating a result of processing of the sensing information by an application or the like, and data including a current state of the node. However, the transmission data is not limited to specific data. The upper layer processor 140 may include a program operated by a processor such as a CPU, may include hardware, or may include both of the software and the hardware. The upper layer processor 140 may execute a process according to a communication protocol of an upper layer of the MAC layer, such as TCP/IP and UDP/IP.

When the access controller 133 receives the transmission request from the upper layer processor 140, the access controller 133 issues a transmission instruction of the connection request signal to the transmission processor 131, and the transmission processor 131 outputs the frame of the connection request signal to the transmitter 121.

The transmitter 121 performs transmission in the control channel and transmission in the data channel. The receiver 122 performs reception in the control channel and reception in the data channel.

The transmitter 121 is set to a channel with a channel No. instructed from the channel controller 134 described later and performs the transmission through the relevant channel. The receiver 122 is set to a channel with a channel No. instructed from the channel controller 134 and performs the reception through the relevant channel.

The beacon signal frame of the control channel is received in the control channel, and the beacon signal frame or the data frame of the data channel is received in the data channel.

The transmitter 121 applies desired processing of physical layer to the frame input from the transmission processor 131 to perform D/A conversion, frequency conversion, or the like and transmits the signal as a radio wave to the space through the antenna 110.

The receiver 122 receives the signal through the antenna 110 to apply reception processing to the signal and outputs the processed frame to the reception processor 132. Examples of the reception processing include frequency conversion to baseband, A/D conversion, analysis of a physical header of the frame after the A/D conversion, a demodulation process, and other desired physical layer processing.

The channel controller 134 controls setting of the PHY & RF unit 120, that is, setting of the transmitter 121 and the receiver 122. For example, the channel controller 134 transmits the channel No. of the channel to be used to the PHY & RF unit 120, and the PHY & RF unit 20 sets the transmitter and the receiver to the channel with the relevant channel No.

Two antennas may be prepared in the node, and communicator (transmitter and receiver) may be prepared for the data channel and the control channel. In this way, the control channel and the data channel can be used at the same time. In this case, ON/OFF of the operation may be controlled by supply of power to circuits.

The reception processor 132 performs analysis or the like of a MAC header of the frame input from the receiver 122. When the reception signal is a connection response signal, the reception processor 132 notifies the relevant connection response to the access controller 133. When the access controller 133 receives the relevant connection response, the access controller 133 determines to switch the operation channel from the control channel to the data channel and reports the channel switch to the channel controller 134. The channel controller 134 instructs the PHY & RF unit 120 to switch and set the data channel.

The access controller 133 controls the access to the data channel based on the information of the allocation slot of the data channel included in the connection response signal. The access controller 33 is aware of a frame holding status of the transmission processor 131 and instructs the transmission processor 31 to transmit the data frame at the timing of the slot allocated to its own node. The transmission processor 31 applies a MAC header addition process or the like to the data frame and outputs the data frame to the transmitter 121.

When the received frame is a data frame as a result of the analysis or the like of the MAC header of the frame input from the receiver 122, the reception processor 132 outputs the processed frame to the upper layer processor 140 as necessary.

The channel controller 134 and the access controller 133 may internally hold the information necessary for the control or may hold the information in an accessible storage not shown. For example, the status of the node, the status of the hub, the channel No. of the data channel, the information of the current operation channel, and the like may be held. Examples of the status of the node include information indicating whether the connection process is executed and information of the remaining amount of battery. The status of the hub may include the information of the transmission timing of the beacon signals of the control channel and the beacon signals of the data channel and ON/OFF state of the power of the hub or may include other information.

Hereinafter, an example of operation of the node will be illustrated. The access controller 133 manages the access to the control channel based on the transmission request from the upper layer processor 140 and instructs the transmission processor 131 to transmit the connection request signal. In this case, the access controller 133 receives the beacon signal transmitted from the hub through the control channel to acquire information necessary to generate the connection request and information of the data channel. The information for specifying the control channel may be stored in advance, or channel search may be performed to specify the control channel. The data channel can be specified by receiving the beacon signal transmitted through the control channel, and the data channel does not have to be searched. The access controller 133 sets the channel No. of the specified data channel in the transmitter 121 and the receiver 122 through the channel controller 134. The channel No. of the data channel may be set at the switch to the data channel described later.

The transmission processor 131 generates a frame of the connection request signal and transmits the frame from the transmitter 121 through the control channel, and the access controller 133 waits for a connection response signal from the hub. When the connection response signal is received, taking the reception as a trigger, the access controller 133 instructs the channel controller 134 to switch the operation channel from the control channel to the data channel, and the channel controller 134 notifies the operation channel information according to the relevant instruction to the PHY & RF unit 120. The PHY & RF unit 120 makes the switch to the data channel according to the operation channel information. The access controller 133 manages the access to the data channel based on the information of the allocation slot in the data channel included in the connection response signal. The access controller 133 is aware of the frame holding status of the transmission processor 31 and instructs the transmission processor 31 to transmit the data frame at the timing of the allocation slot of its own node.

Figure 26:
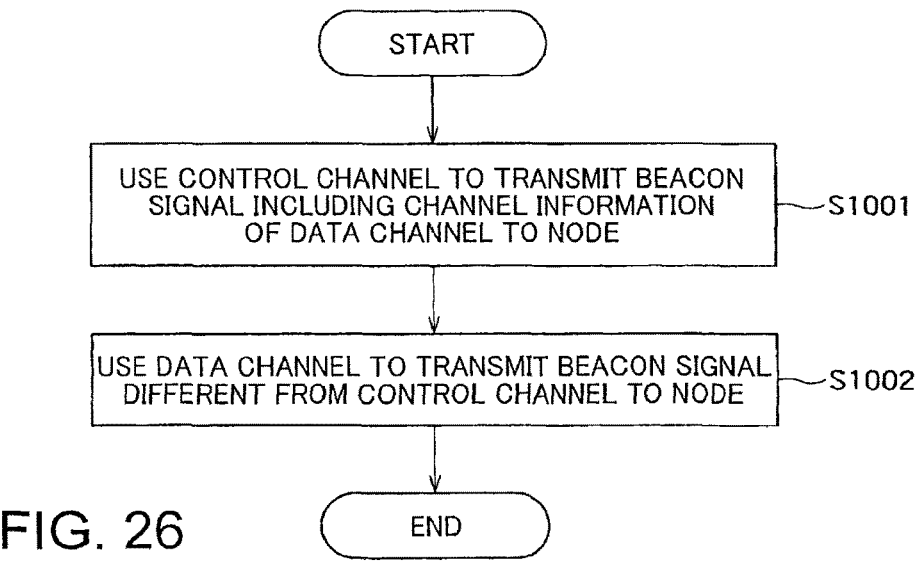
FIG. 26 is a flow chart of an example of basic operation of the hub according to the first embodiment.

FIG. 26 is a flow chart of an example of basic operation of the hub according to the first embodiment. The hub uses the control channel (first channel) to transmit the beacon signal (first announcement signal) including the channel information of the data channel (second channel) to the node (S1001). The hub uses the data channel to transmit a beacon signal (second announcement signal) different from the relevant beacon signal to the node (S1002).

Figure 27:
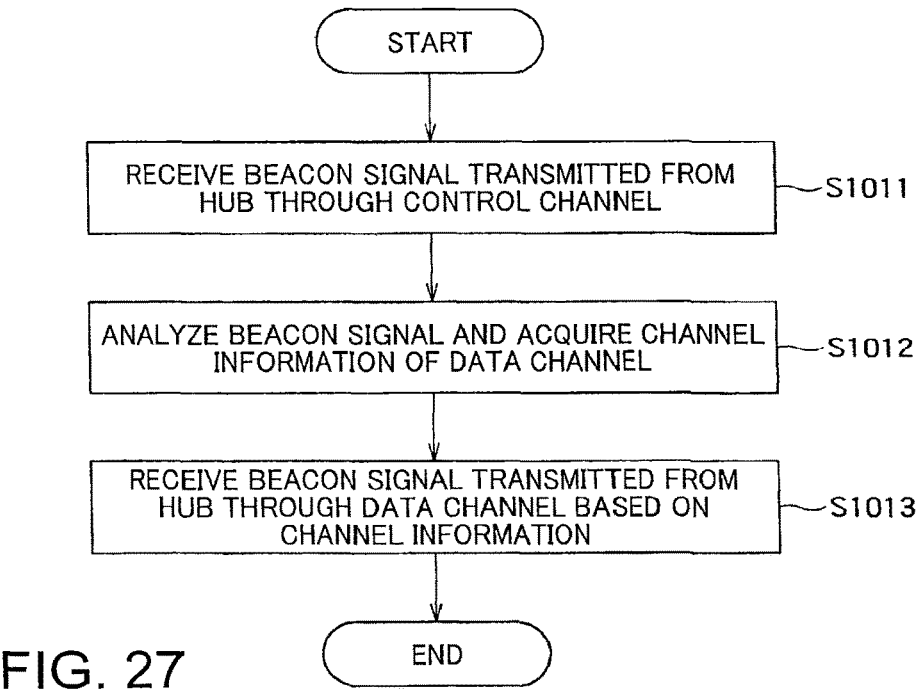
FIG. 27 is a flow chart of an example of basic operation of the node according to the first embodiment.

FIG. 27 is a flow chart of an example of basic operation of the node according to the first embodiment. The node receives the beacon signal (first announcement signal) transmitted through the control channel (first channel) from the hub (S1101). The node analyzes the received beacon signal to acquire the channel information of the data channel (second channel) (S1012). The node receives the beacon signal (second announcement signal) transmitted from the hub through the data channel based on the acquired channel information (S1013).

As described, the hub including the wireless communication device according to the first embodiment includes the channel information of the data channel in the beacon signal of the control channel. Therefore, the node does not have to perform the channel search of the data channel, and the power consumption necessary for the search can be reduced.

The transmission frequency of the beacon signals transmitted through the data channel is lower than that of the control channel, and the node uses the control channel to execute the process of connection with the hub. In this way, the power consumption after the shift to the data channel can be reduced. As described, when the transmission frequency of the beacon signals transmitted through the data channel is the same as that of the control channel or higher than that of the control channel, the period or the number of times of the node receiving the beacon signals through the data channel may be reduced to reduce the power consumption.

The amount of information included in the beacon signal transmitted through the data channel can be smaller than that of the control channel, and the signal length of the beacon signal of the data channel can be shorter than the beacon signal length of the control channel. In this way, the node uses the control channel to execute the process of connection with the hub, and the power consumption after the shift to the data channel can be reduced.

Second Embodiment

The basic operation of the hub and the node using at least two channels including the control channel and the data channel is described in the first embodiment. In the present embodiment, access schemes of the channels will be described. The TDMA is used in the data channel, and the CSMA is used in the control channel in the case illustrated in the first embodiment. The reason will be described below.

An object of the control channel is to allow a large number of nodes to connect to the hub by exchanging necessary control information, such as connection request signals and connection response signals, with the hub. Therefore, an access scheme using carrier sense, such as a contention-based CSMA (Carrier Sense Multiple Access) scheme, is suitable as the access scheme. On the other hand, when data is generated at a constant period in each node, the data can be transmitted from the node to the hub at the timing according to the period if, for example, the node includes a sensor that periodically acquires the data. Therefore, a scheme for allocating the data transmission timing at a request period determined from the sensor or the like, that is, a TDMA (Time Division Multiple Access)-based scheme, is suitable for the data channel.

In this way, different access schemes can be used in the control channel and the data channel to perform communication suitable for the intended use of each channel. However, it is obvious that the embodiments of the present invention are not limited to these access schemes.

Third Embodiment

In the present embodiment, the connection request signal (C-Req) and the connection response signal (C-Ass) used in the connection process in the control channel will be described. A method of allocating the slots in the TDMA scheme will be described.

It is assumed that the connection request signal transmitted from the node includes information related to at least a request allocation frequency and a request allocation length. The request allocation frequency denotes, for example, a frequency of allocating the slots (for example, once every N. times of transmission of the beacon signals through the data channel), and the request allocation length denotes a duration of requesting the allocation (for example, the number of slots for request in a beacon interval).

In the hub, for example, the access controller 33 determines whether the connection request signal from the node can be handled based on information of currently managing allocated slots or the like. If the connection request signal can be handled, the access controller 33 allocates the requested number of slots to the node at the requested frequency and returns a connection response signal including information (allocation information) related to the allocated frequency and slots. If the request of the node cannot be handled as a result of the determination, the access controller 33 may return a connection response signal including candidate information related to the frequency and the number of slots that can be allocated.

The connection request signal from the node may include the request allocation frequency and the allocation duration (the number of slots) of each data ID associated with the sensor type or the like. For example, when a plurality of types of sensors are mounted in the node, a first connection request includes each data ID as well as the request allocation frequency and the request allocation length of each sensor based on the types of all the mounted sensors. The access controller of the hub that has received the relevant connection request from the node may determine the sensors that perform the data transmission and the sensors that do not perform the data transmission based on a certain standard. For example, when there are connection requests for both of a pulse sensor from a node attached to the right arm of the human body and a pulse sensor of a node attached to the left arm, the access controller may determine that the reception of a sensor value for the left arm is not necessary and may determine not to perform the data transmission of the pulse sensor of the node attached to the relevant left arm if a value of only one of the sensors is required. In this case, a connection response signal including the data ID of only the sensor type that requests the data transmission as well as the allocation frequency and the allocation slot for the data ID may be returned to the relevant node.

Figure 8:
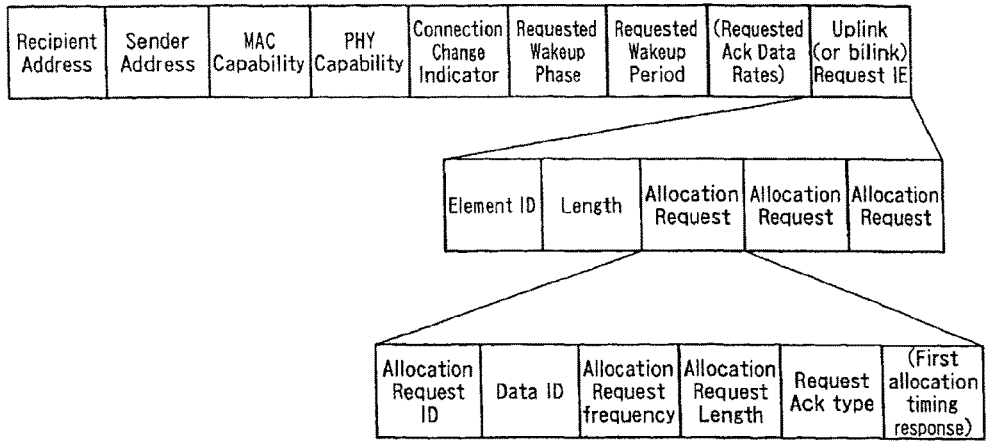
FIG. 8 is a diagram showing an example of signal format of a connection request signal and a connection response signal according to the first embodiment.
Figure 8:
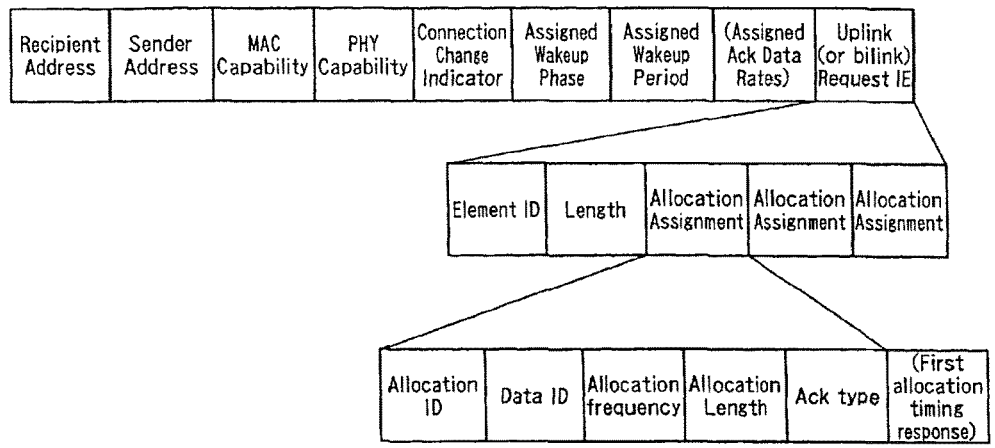

FIG. 8 shows an example of signal format of the connection request signal and the connection response signal. Although fields other than the parts described above are basically written based on IEEE 802.15.6 specifications, the present embodiment is not necessarily limited to the format shown in FIG. 8.

In the example shown in FIG. 8, an "allocation Request" field of "Uplink Request IE" includes each data ID (written as "Data ID" in FIG. 8) as well as the request allocation frequency ("Allocation Request Frequency") and the request allocation length ("Allocation Request Length") for the data ID. If there are a plurality of response frame types, a field of requested response frame type ("Request Ack Type") is included. Examples of the types of response frame include an ACK type for returning a positive response when the reception is normal and a NACK type for returning a negative response when the reception has failed (such as when an error is detected). This will be described in a seventh embodiment.

In this way, as a result of the exchange of the connection request signal and the connection response signal, the hub can specify the allocation frequency and the allocation slots for each node.

The allocation information of the slots for each node of TDMA can be included in the beacon signal or the connection response signal and notified to the node. When the allocation information is inserted to the beacon signal of the control channel, each node can always specify the allocation status of the slots for each user of TDMA once the node receives the beacon signal of the control channel. However, the beacon signal of the control channel becomes long. On the other hand, when the allocation information is inserted to the connection response signal, the node that wants to specify the allocation status for each user of TDMA needs to transmit the connection request signal.

Figure 9:
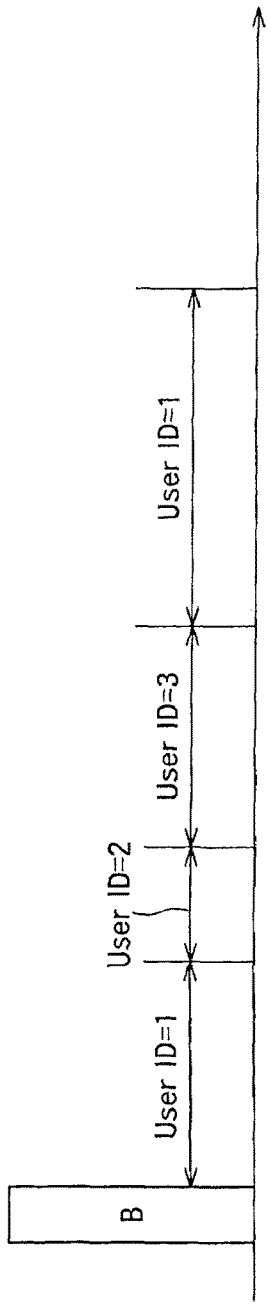
FIG. 9 is a diagram showing an example of configuration of allocation information inserted to the beacon signal or the connection response signal of the control channel according to a third embodiment.

FIG. 9 shows examples of the fields related to the allocation information for each user of TDMA inserted to the beacon signal or the connection response signal. FIG. 9 shows an example (1) for notifying the allocation slot numbers (hereinafter, slot Nos.) and an example (2) for notifying the number of allocation slots. Although the allocation available period of the data channel is started after the completion of the beacon signal transmission of the data channel in the illustrated examples, this is just an example, and the present embodiment is not limited to the example.

In the notification of the slot Nos., allocation start and end slot Nos. of each user ID (node ID) are notified. For example, first, second, sixth, seventh, and eighth slots are allocated to the user with "user ID=1" in the example (1). In this case, "1-2" and "6-8" are separately written.

Meanwhile, in the notification of the number of slots, the number of allocation slots of each user is notified according to the order of allocation. Since each number of allocation slots of each user is notified in this case, the length of the notification field can be smaller than in the notification of the slot Nos. However, internal processing of converting the information of each number of allocation slots of each user written in the notification field into allocated slot Nos. is necessary in each node that has received the number of allocation slots of each user.

In this way, the mechanism of the allocation request and the mechanism of notifying the allocation status are provided in the wireless communication device according to the third embodiment, and the allocation request from the node and the allocation in response to the allocation request can be easily performed.

Fourth Embodiment

In the present embodiment, processes of changing the allocation to the node in which the slot allocation of the data channel is already performed will be described. Processes are different in a case in which the node requests the allocation change and in a case in which the hub requests the allocation change. The cases will be separately described below.

[When Node Requests Allocation Change]

The access controller of the node determines to request the allocation change based on a certain standard. The standard may be any standard, such as when the number or type of sensing information to be transmitted is to be increased, when the transmission of part of the transmitted sensing information is to be stopped, and when the data length of the sensing information is increased.

When the allocation change is determined, taking the determination as a trigger, the node switches the operation channel from the data channel to the control channel and starts checking the channel status of the control channel. The node detects an available control channel by, for example, carrier sense and transmits a connection request signal including information related to the request allocation frequency and the request allocation length after the change. The control of the processes is performed by, for example, the access controller of the node. The connection request signal is the same as a new connection request in terms of format. However, a signal different from the connection request signal may be defined, and the signal may be used to request the allocation change. The operation of the hub is the same as the operation described in the first to third embodiments, and the description will not be repeated here.

Although the mechanism of performing the allocation change request and the response process in the control channel is illustrated, an available time of the data channel may be used to execute the process as in the initial connection described in the first embodiment.

[First Example of Case in which Hub Requests Allocation Change]

Figure 10:
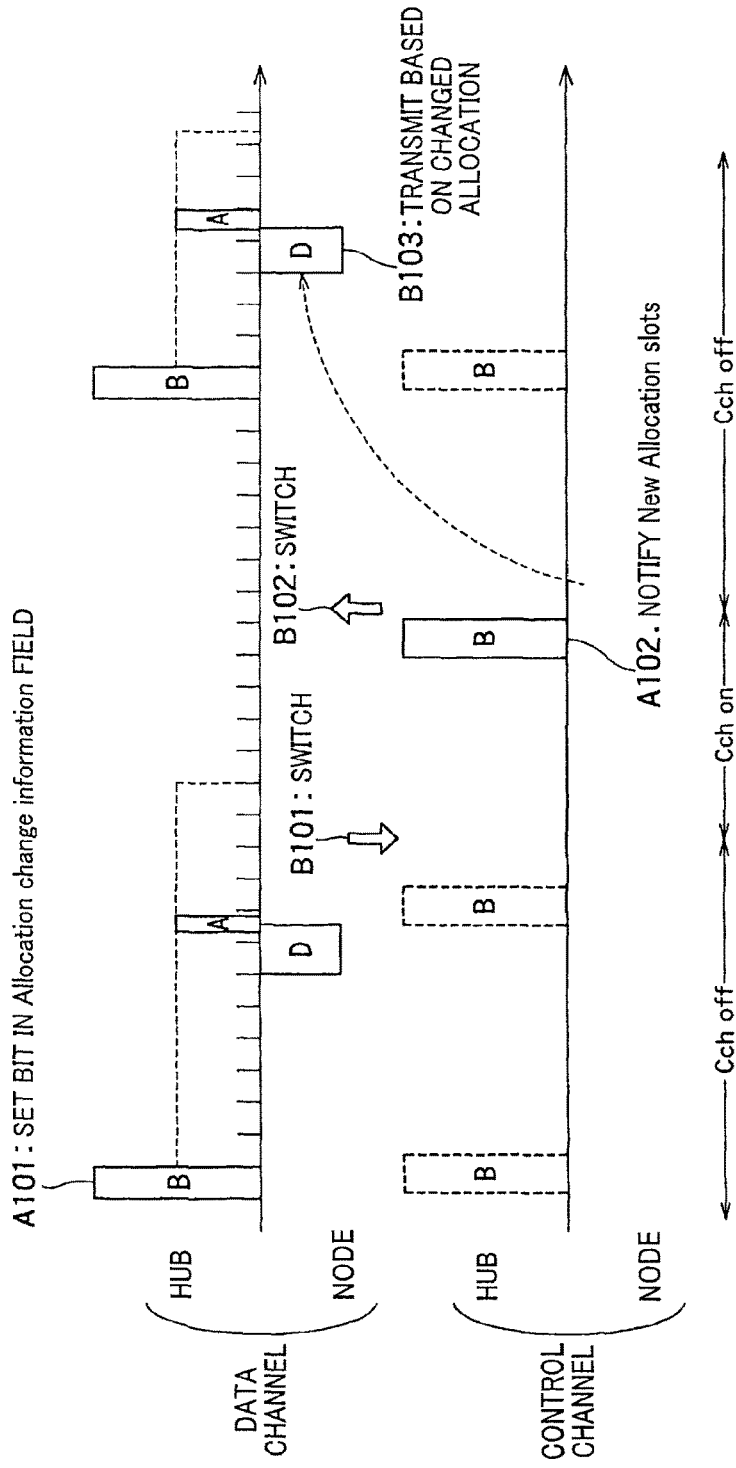
FIG. 10 is a timing diagram of operation when the hub requests allocation change according to a fourth embodiment.

FIG. 10 shows a timing diagram of the operation when the hub requests the allocation change.

The access controller of the hub determines to request the allocation change for a node based on a certain standard. When the allocation change is determined, taking the determination as a trigger, the hub sets a bit (change bit) at the bit position indicating the node for changing the allocation in the "Allocation change information" field (see FIG. 4) of the beacon signal of the data channel and transmits the beacon signal frame (A101). Subsequently, the hub includes the allocation information after the change as described in the third embodiment in the beacon signal of the control channel or the connection response signal and notifies the signal. In the illustrated example, the hub notifies the allocation information after the change based on the beacon signal of the control channel (A102). The access controller of the hub controls the processes.

The node switches the operation channel to the control channel when the bit is set at its own bit position in the "Allocation change information" field (B101). The node receives the beacon signal of the control channel or transmits the connection request signal to receive the response signal of the signal to thereby obtain new allocation information. In the illustrated example, the node receives the beacon signal of the control channel to receive the allocation information after the change (A102). Subsequently, the node returns the operation channel to the data channel (B102), and after the reception of the next beacon signal of the data channel, the node uses newly allocated slots to perform transmission and reception (B103). The control of the processes is performed by, for example, the access controller of the node.

The node may be configured to receive the beacon signal of the data channel once every plurality of beacon signals in order to reduce the power consumption, depending on the node. In this case, the hub needs to perform the actual allocation change according to the timing that at least all nodes for changing the allocation among the accommodated nodes check the presence or absence of the change bits. Therefore, the change bits may be set in the beacon signals of the data channel at the relevant timing to insert the information specifying the timing of the actual allocation change into the beacons. Alternatively, the information specifying the timing of the change may be inserted to the relevant beacon signals of the control channel for notifying the allocation information after the change, instead of the beacon signals of the data channel.

Meanwhile, if the beacon signal of the data channel includes the notification of the timing of the allocation change when the node receives the beacon signal of the data channel with the bit set at the bit position addressed to the node in the "allocation change information" field, the node changes the operation channel from the data channel to the control channel when the notification is sensed, taking the sensing as a trigger. The node receives the beacon signal of the control channel or the connection response signal including the new allocation information through the control channel after the change to thereby specify the new allocation information notified from the hub.

[Second Example of Case in which Hub Requests Allocation Change]

Figure 11:
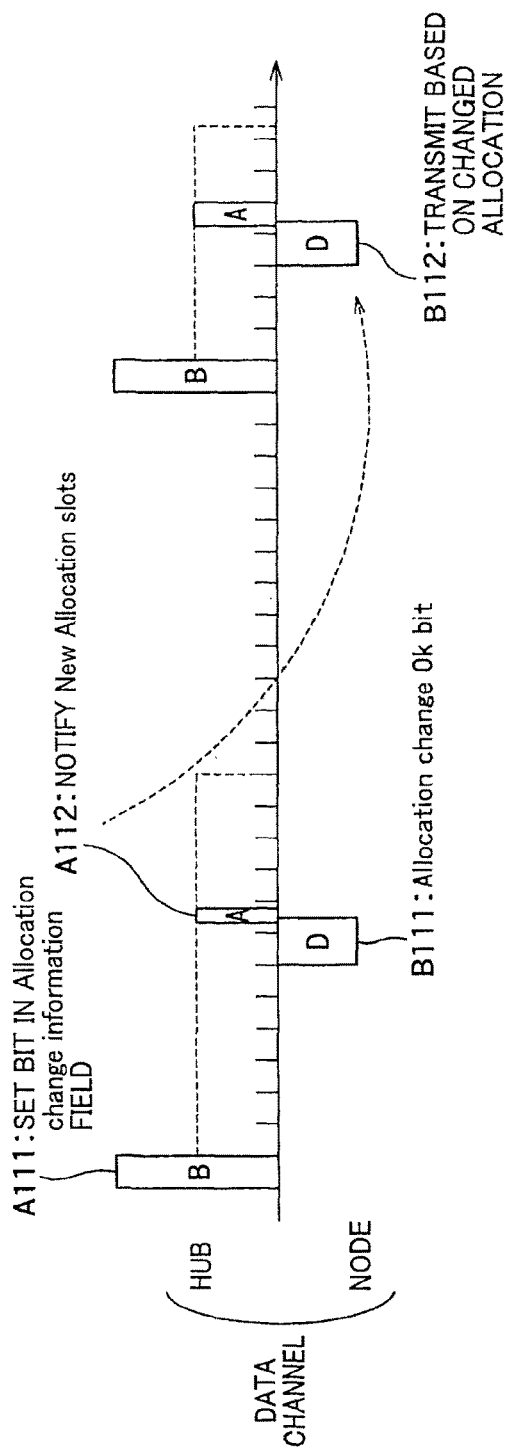
FIG. 11 is a timing diagram of another operation when the hub requests the allocation change according to the fourth embodiment.

FIG. 11 is a timing diagram of another operation when the hub requests the allocation change. Although operation in which the hub sets a bit (change bit) in the "Allocation change information" field of the beacon signal of the data channel (A111) is the same as the operation shown in FIG. 10 (A101), subsequent operation is different from FIG. 10.

In the operation shown in FIG. 11, the node that has received the beacon signal of the data channel with the change bit set subsequently sets a bit in an "Allocation change ok bit" of the header of the data frame transmitted in the current allocation to thereby notify consent of the change (B111). In response, the hub notifies new allocation information in a response signal (ACK signal) (A112). After reception of the next beacon signal of the data channel, the node performs transmission and reception according to the new allocation information (B112).

When the allocation change is necessary in a plurality of nodes, and the reception timing of the beacon signals of the data channel varies among the nodes, the hub can adjust the timing of insertion of the notification of the "New Allocation slot" into the response signal according to each node. Compared to FIG. 10, the process shown in FIG. 11 has an advantage that the node can execute the process only with the data channel without making a shift to the control channel.

[Third Example of Case in which Hub Requests Allocation Change]

Figure 12:
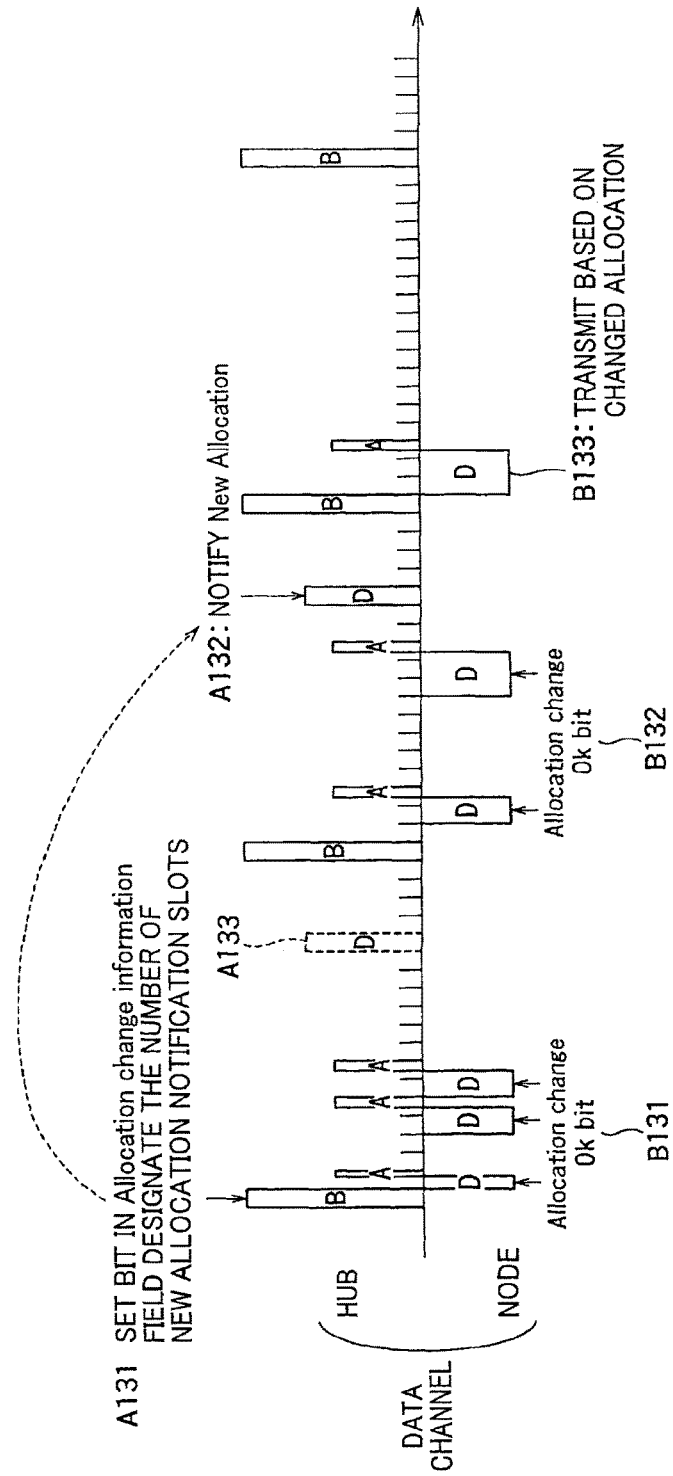
FIG. 12 is a timing diagram of another operation when the hub requests the allocation change according to the fourth embodiment.

FIG. 12 is a timing diagram of another operation in which the hub requests the allocation change. Although the operation in which the hub sets a bit (change bit) in the "Allocation change information" field of the beacon signal of the data channel is the same as the operation (A101) shown in FIG. 10, the operation is different in that a notification slot of new allocation information is designated in the beacon signal in this case.

In the operation shown in FIG. 12, the hub determines a slot (notification slot) for notifying new allocation information from among the available slots in which the slots are not allocated at this point and notifies the notification slot No. along with the operation of setting the bit (change bit) in the "Allocation change information" field in the beacon signal of the data channel (A131).

The node that has received the beacon signal of the data channel with the change bit (A131) set executes the reception process in the notification slot designated by the hub to receive the new allocation information (A132). After the reception of the next beacon signal of the data channel, the node performs transmission and reception according to the new allocation information (B133).

Not all nodes always receive the beacon signals of all data channels. Therefore, the bit may be set in the "Allocation change ok bit" of the header of the data frame as in the operation shown in FIG. 11 to provide a mechanism of notifying consent of the change in the node (B131 and B132). In this case, for example, when the bit (change bit) is set in the "Allocation change information" field in a beacon signal of a data channel, and the "Allocation change ok bits" are not obtained from all corresponding nodes in the signals from the nodes just after the beacon signal, the new allocation information may not be transmitted in the notification slot in the beacon signal period (A133), and the new allocation information may be transmitted after responses are obtained from all corresponding nodes (A132). Compared to FIG. 11, the process shown in FIG. 12 has an advantage that the hub can transmit the new allocation information to a plurality of nodes at once.

Fifth Embodiment

In the present embodiment, a process of a case in which downlink data to be transmitted to the node is generated in the hub will be described.

Figure 13:
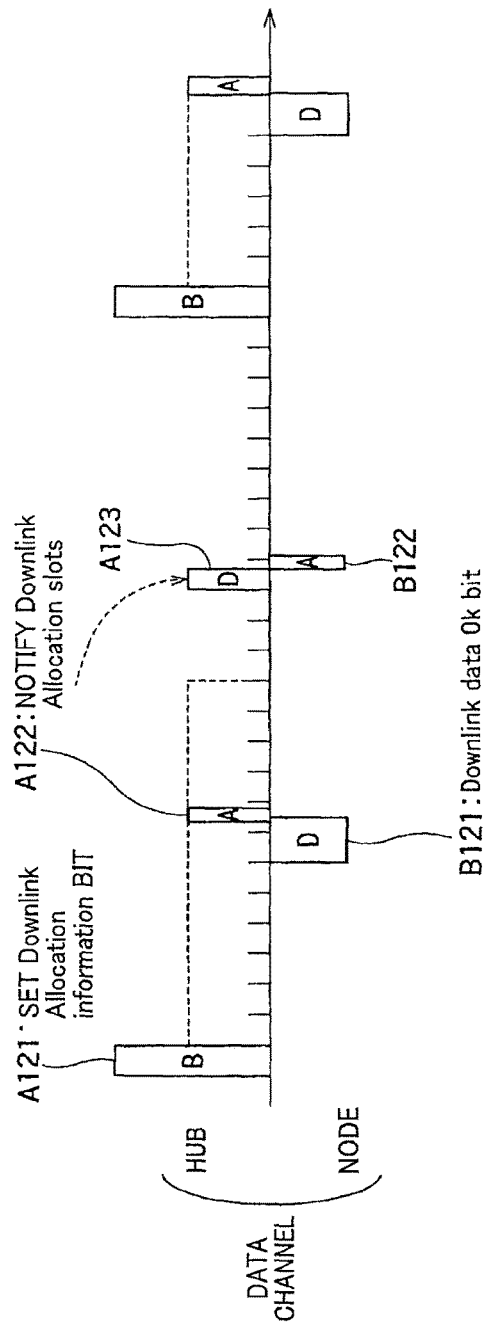
FIG. 13 is a timing diagram of operation when downlink data for the node is generated in the hub according to a fifth embodiment.

FIG. 13 shows a timing diagram according to the present embodiment. When the downlink data to be transmitted to the node is generated, the hub transmits the beacon signal of the data channel with the bit set at the bit position addressed to the node in the "Downlink allocation information" field of the beacon signal of the data channel as in the fourth embodiment (A121). The node that has checked the bit addressed to the "Downlink allocation information" field transmits a data frame with the "Downlink allocation ok bit" set at the data transmission (B121), and in response, the hub notifies the allocation information to the relevant node in a response signal (ACK signal) (A122). The hub transmits the downlink data in the slot indicated by the allocation information notified to the node (A123), and the node that has received the downlink data returns an ACK response (B122). The access controllers of the hub and the node can control the processes.

In this way, according to the fifth embodiment, the generation of the downlink data is notified by the beacon signal from the hub, the bit of the data frame is used to notify the confirmation to the hub, and the new allocation information is notified by the response signal, when the downlink data to be transmitted to the node is generated. As a result, the downlink data can be transmitted.

Sixth Embodiment

In a case described in the present embodiment, the control channel and the data channel have different bandwidths of channel.

In general, when a used band is determined in a system, the number of channels that can be secured varies according to the bandwidth per channel. For example, in two standards of "Bluetooth" and "Bluetooth Low Energy", 80 channels are secured in "Bluetooth" with a width of 1 MHz per channel, and 40 channels are secured in "Bluetooth Low Energy" with a width of 1 MHz per channel in the same used band. In general, the channel width and the number of channels are determined in each system.

For example, when the amount of transmitted and received data of each node is large although the number of accommodated nodes is not so high, or when the data transmission and reception frequency is high, the bandwidth of the data channel is set larger than the bandwidth of the control channel. For example, the width of the data channel is set to 2 MHz, and the width of the control channel is set to 1 MHz. On the other hand, when a large number of accommodated nodes need to be secured, the bandwidth of the control channel is set larger than the bandwidth of the data channel. For example, the data channel is set to 1 MHz, and the control channel is set to 2 MHz.

The work of determining the channel widths of the control channel and the data channel may be decided for the entire system, or each hub may determine the channel widths. When each hub determines the channel widths, the channel width of the control channel may be unified in the entire system to allow reception by other hubs and the like, and each hub may select the bandwidth to be used for the data channel, for example. The channels to be used can be notified in the use channel notification field included in the beacon signal of the control channel, so that the nodes, the other hubs, and the like can specify the information of the channel widths.

In this way, different allocation bandwidths are set for the control channel and the data channel, and the channels suitable for the request to be satisfied in the system can be set. For example, the channels can be set according to a request, such as accommodating a large number of terminals, increasing the amount of data to be transmitted and received, and securing a high frequency of the data to be transmitted and received.

Seventh Embodiment

In a case illustrated in the present embodiment, the control channel and the data channel have different types of response frame.

An ACK scheme for transmitting a response at normal reception of a frame and a NACK (or NAK) scheme for transmitting a response only upon an error and not returning the response at the normal reception of the frame are used in the case illustrated in the present embodiment. However, the ACK scheme and the NAK scheme are examples, and other schemes may be used as long as the response is returned based on a similar relationship. For example, a Block ACK scheme and a Block NAK scheme may be used.

An ACK response is received at the normal reception in the transmission and reception using the ACK scheme, and whether the frame transmission is successful can be surely determined.

On the other hand, although the transmission and reception using the NAK scheme has an advantage that the power necessary for the transmission process and the reception process can be reduced, there is a problem that the determination of whether the frame transmission is actually successful is not clear. More specifically, when the channel is stable, and a frame error is unlikely to occur in the NAK scheme, transmission opportunities of the NAK frame are reduced, and the power necessary for the transmission process and the reception process can be reduced. However, when a counterpart device does not receive the transmitted frame due to fading or the like, a NAK response is not returned, and the transmission side does not receive the NAK response due to fading or the like even if the counterpart device returns the NAK response. In these cases, there is a problem that the transmission side that does not receive the NAK response misunderstands that the frame transmission is successful.

In view of these points, the ACK scheme and the NAK scheme are selectively used in the present embodiment. Specifically, the ACK scheme and the NAK scheme are selectively used according to an access scheme. For example, transmission and reception of the ACK scheme are always performed in the control channel for CSMA-based access in which there is a possibility of collision although carrier sense transmission is performed. On the other hand, transmission and reception of the NAK scheme are performed for low power consumption in the TDMA-based data channel in which the band is allocated in advance, and the probability of collision is low. The access controller of the node can determine and instruct the response scheme.

In this way, the type of the response scheme can be changed according to the data channel and the control channel with different access schemes. As a result, the NAK scheme can be effectively utilized, and the power consumption of the node can be reduced.

Eighth Embodiment

Figure 14:
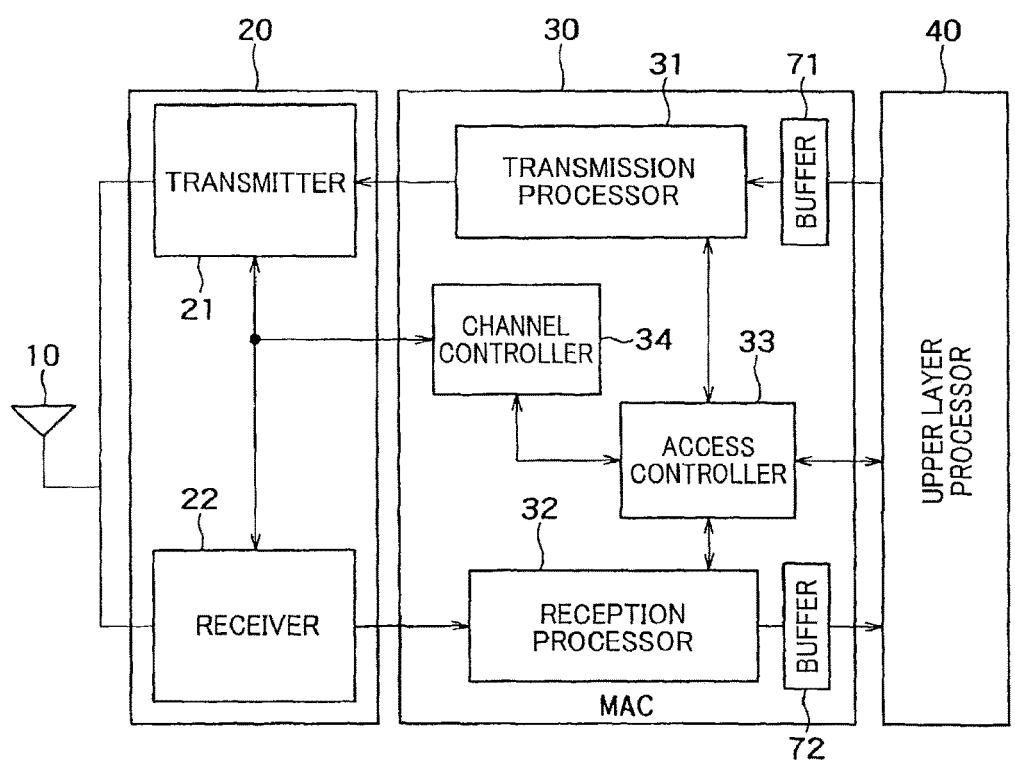
FIG. 14 is a block diagram of a wireless communication device in the hub according to an eighth embodiment.

FIG. 14 shows a block diagram of a wireless communication device in a hub according to an eighth embodiment.

In the hub shown in FIG. 14, buffers 71 and 72 are added to the MAC unit 30 of the wireless communication device according to the first embodiment shown in FIG. 6. The buffers 71 and 72 are connected to the transmitter 30 and the receiver 32, respectively. The upper layer processor 40 performs input and output with the transmission processor 30 and the reception processor 32 through the buffers 71 and 72. The buffers 71 and 72 can be, for example, arbitrary volatile memories or non-volatile memories. In this way, the buffers 71 and 72 can be provided to hold the transmission frame and the reception frame in the buffers 71 and 72. QoS control according to the retransmission process, the frame type, and the like or the output process to the upper layer processor 40 can be easily performed.

The configuration of adding the buffers can be similarly applied to the node.

Figure 15:
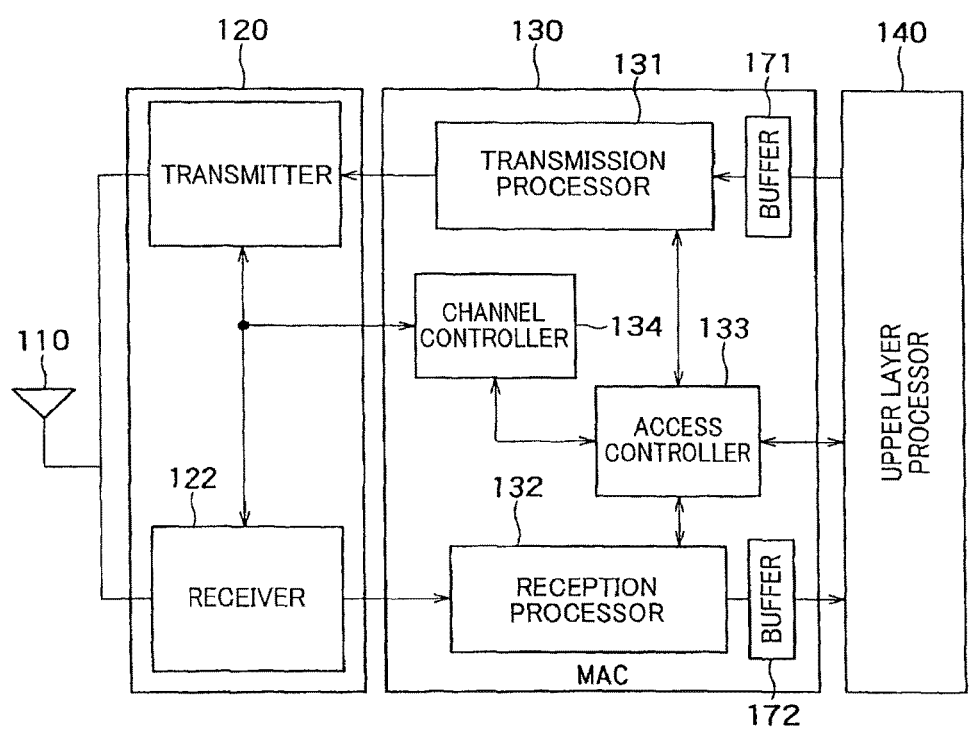
FIG. 15 is a block diagram of a wireless communication device in the node according to the eighth embodiment.

FIG. 15 shows a block diagram of a wireless communication device in a node according to the eighth embodiment.

In the node shown in FIG. 15, buffers 171 and 172 are added to the MAC unit 130 of the wireless communication device according to the first embodiment shown in FIG. 7. The buffers 171 and 172 are connected to the transmitter 130 and the receiver 132, respectively. The upper layer processor 140 performs input and output with the transmission processor 130 and the reception processor 132 through the buffers 171 and 172. The buffers 171 and 172 can be, for example, arbitrary volatile memories or non-volatile memories. In this way, the buffers 171 and 172 can be provided to hold the transmission data and the reception data in the buffers 171 and 172. QoS control according to the retransmission process, the frame type, and the like or the output process to the upper layer processor 140 can be easily performed.

Ninth Embodiment 9

Figure 16:
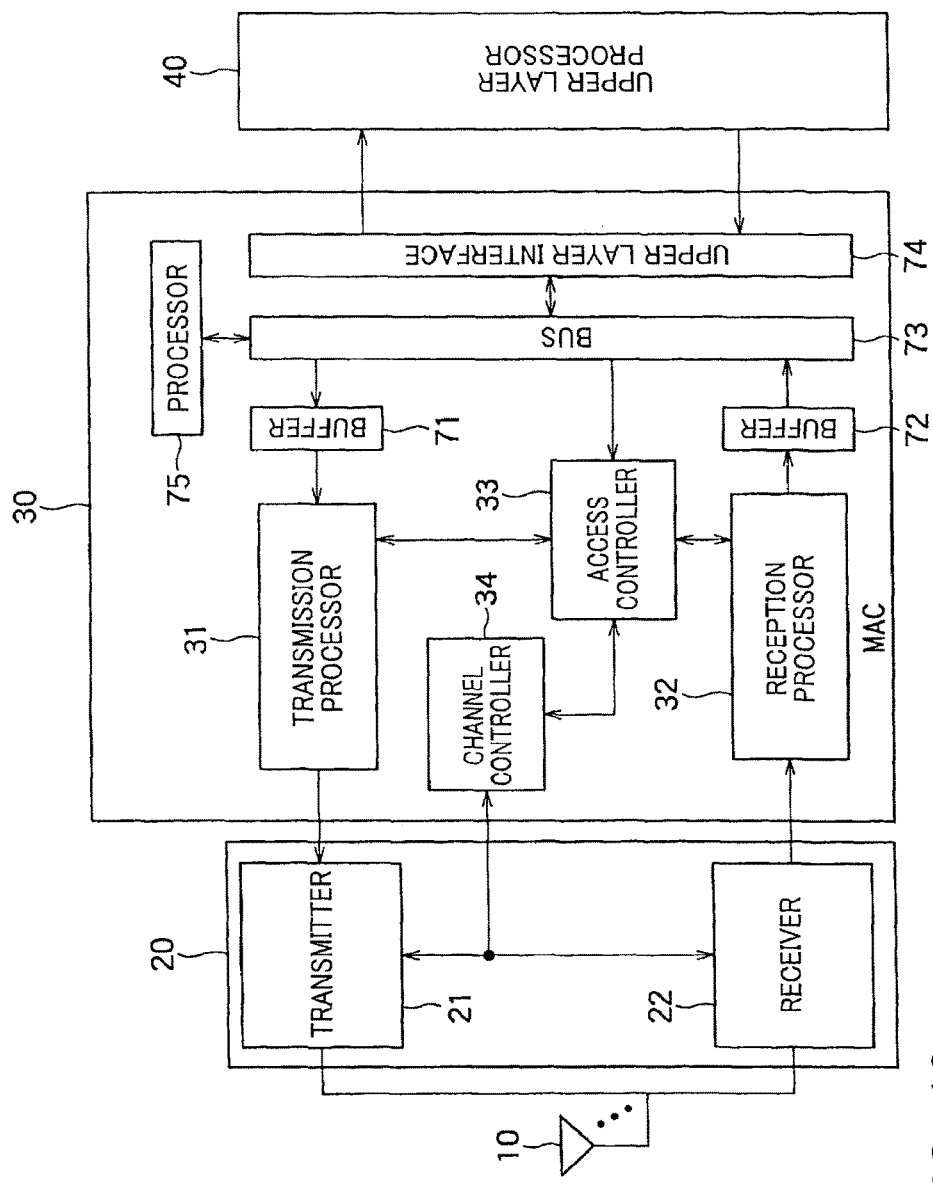
FIG. 16 is a block diagram of a wireless communication device in the hub according to a ninth embodiment.

FIG. 16 illustrates a block diagram of a wireless communication device in the hub relating to an ninth embodiment 9.

The hub illustrated in FIG. 16 has a form that a bus 73 is connected to the buffers 71 and 72 and the access controller 33 in the eighth embodiment illustrated in FIG. 14, and an upper layer interface 74 and a processor 75 are connected to the bus 73. The MAC unit 30 is connected with the upper layer processor 40 at the upper layer interface 74. In the processor 75, firmware is operated. By rewriting the firmware, functions of the wireless communication device can be easily changed. The function of at least one of the access controller 33 and the channel controller 34 may be achieved by the processor 75.

Figure 17:
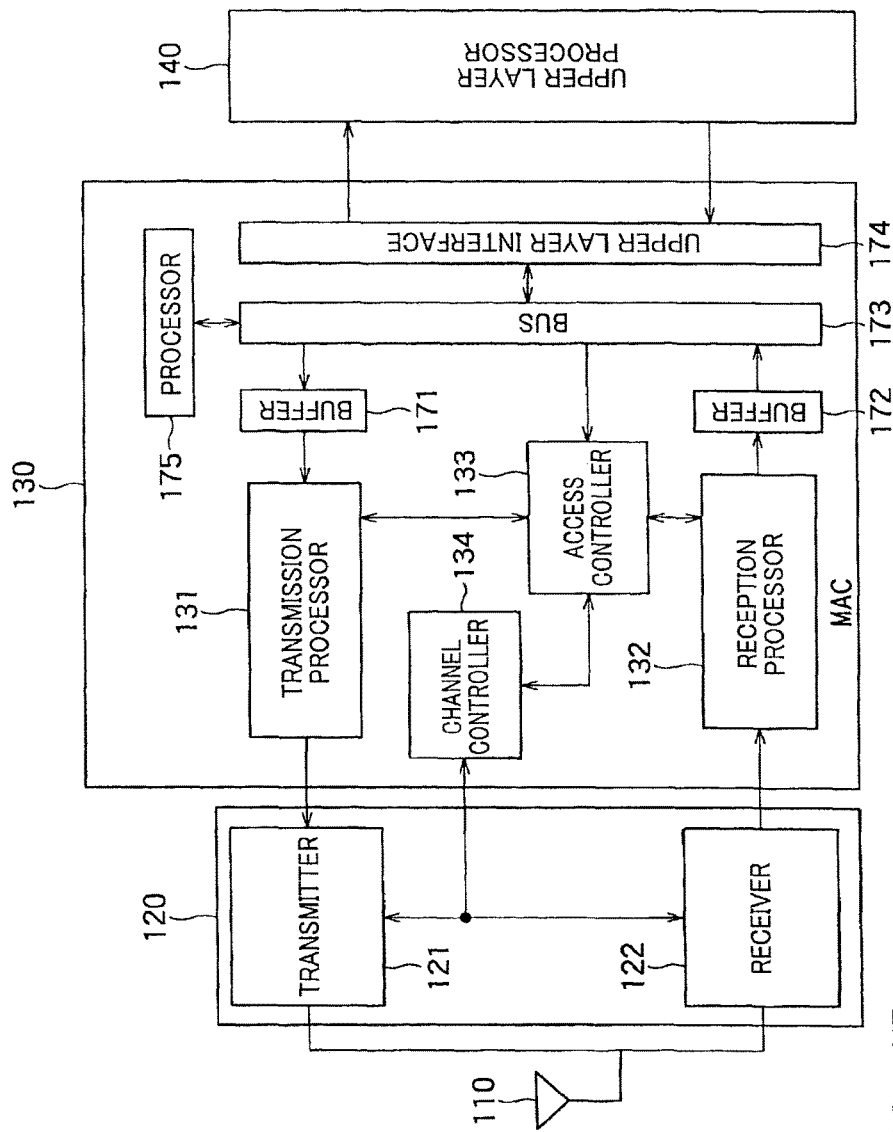
FIG. 17 is a block diagram of a wireless communication device in the node according to the ninth embodiment.

FIG. 17 illustrates a block diagram of a wireless communication device in the node relating to the ninth embodiment.

The node illustrated in FIG. 17 has a form that a bus 173 is connected to the buffers 171 and 172 and the access controller 133 in the eighth embodiment illustrated in FIG. 15, and an upper layer interface 174 and a processor 175 are connected to the bus 173. The MAC unit 130 is connected with the upper layer processor 140 at the upper layer interface 174. In the processor 175, the firmware is operated. By rewriting the firmware, functions of the wireless communication device can be easily changed. The function of at least one of the access controller 133 and the channel controller 134 may be achieved by the processor 175.

Tenth Embodiment

Figure 18:
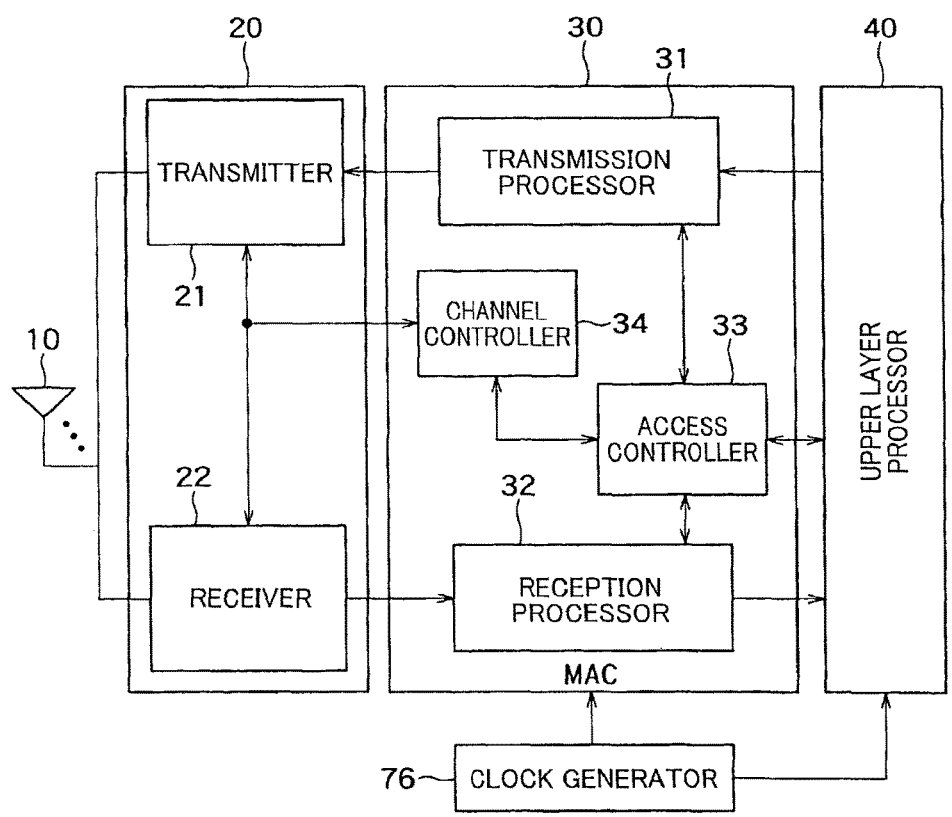
FIG. 18 is a block diagram of a wireless communication device in the hub according to a tenth embodiment.

FIG. 18 illustrates a block diagram of a wireless communication device in the hub relating to a tenth embodiment.

The wireless communication device illustrated in FIG. 18 has a form that a clock generator 76 is connected to the MAC unit 30 in the hub relating to the first embodiment illustrated in FIG. 6. The clock generator 76 is connected through an output terminal to an external host (the upper layer processor 40 here), and a clock generated by the clock generator 76 is given to the MAC unit 30 and is also outputted to the external host. By operating the host by the clock inputted from the clock generator 76, a host side and a wireless communication device side can be operated in synchronism. In this example, the clock generator 76 is arranged on the outer side of the MAC unit, however, it may be provided inside the MAC unit.

Figure 19:
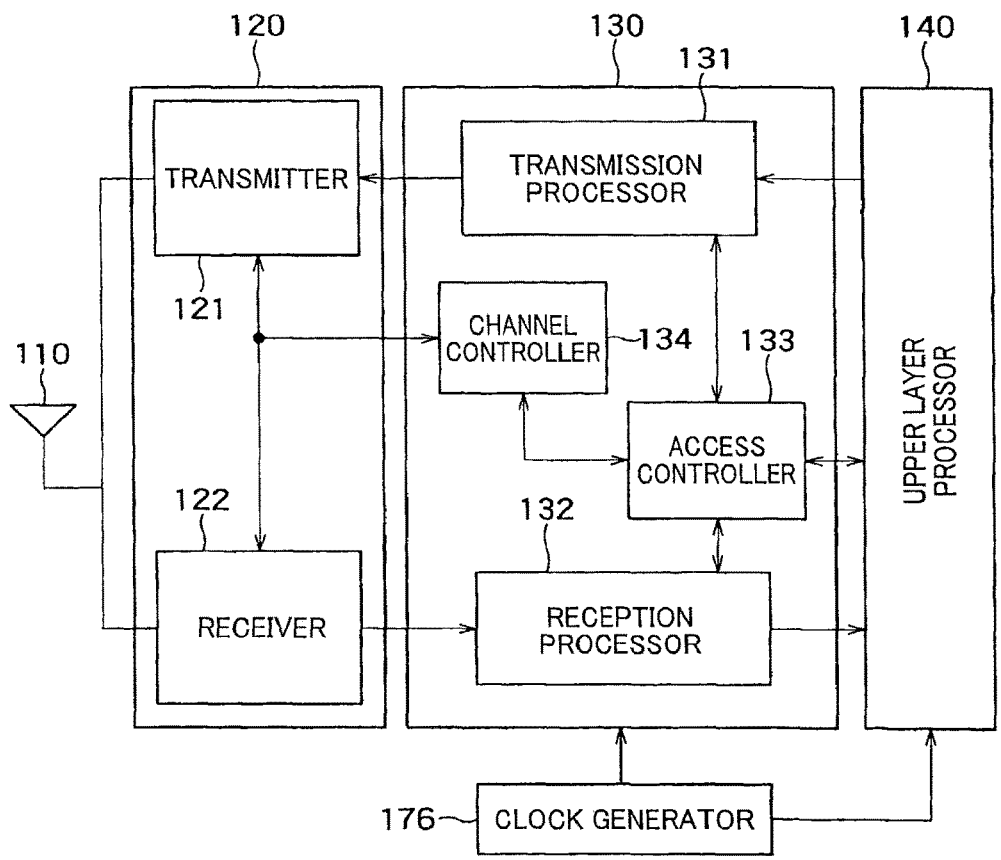
FIG. 19 is a block diagram of a wireless communication device in the node according to the tenth embodiment.

FIG. 19 illustrates a block diagram of a wireless communication device in the node relating to the tenth embodiment.

The wireless communication device illustrated in FIG. 19 has a form that a clock generator 176 is connected to the MAC unit 130 in the node relating to the first embodiment illustrated in FIG. 7. The clock generator 176 is connected through an output terminal to an external host (the upper layer processor 140 here), and a clock generated by the clock generator 176 is given to the MAC unit 130 and is also outputted to the external host. By operating the host by the clock inputted from the clock generator 176, the host side and the wireless communication device side can be operated in synchronism. In this example, the clock generator 176 is arranged on the outer side of the MAC unit, however, it may be provided inside the MAC unit.

Eleventh Embodiment

Figure 20:
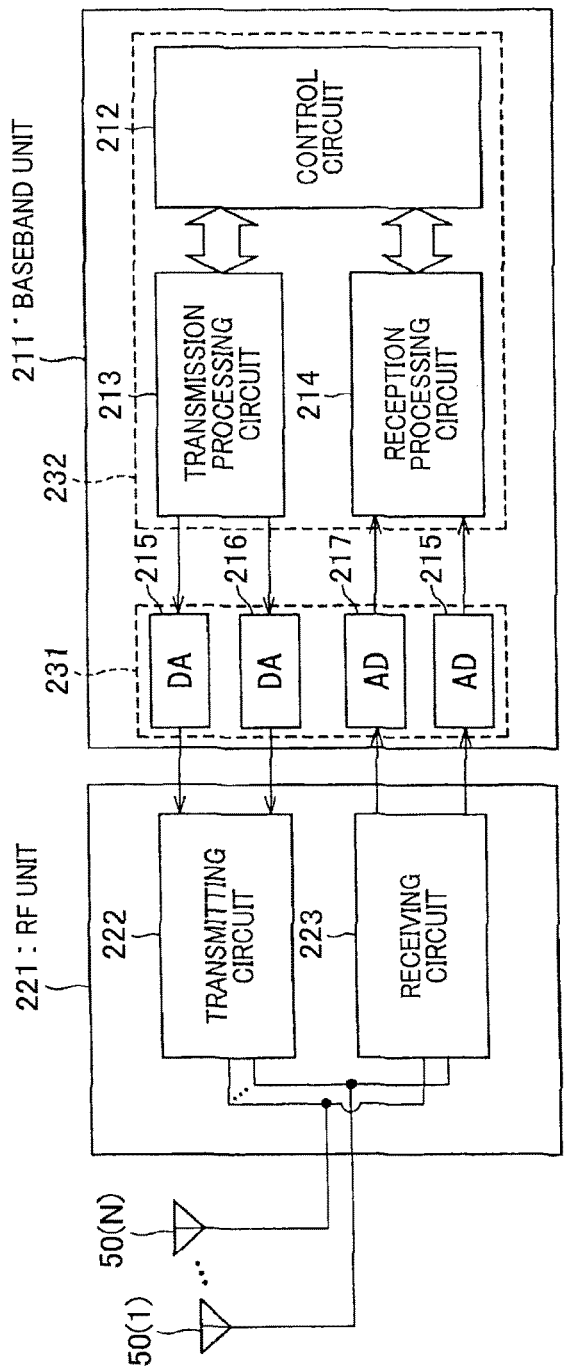
FIG. 20 is a hardware block diagram of a wireless communication device according to an eleventh embodiment.

FIG. 20 illustrates an example of a hardware configuration of a wireless communication device in accordance with an eleventh embodiment. This hardware configuration is only provided by way of example, and various modifications can be made to this hardware configuration. The operation of the wireless communication device illustrated in FIG. 20, detailed description of which is omitted, proceeds in the same or similar manner as in the wireless communication devices described in the context of the previous embodiments, and the following explanation focuses on the differences in respect of the hardware configuration. It should be noted that the illustrated hardware configuration can be applied both to the wireless communication device that operates as a base station and to the wireless communication device that operates as a slave station.

This wireless communication device includes a baseband unit 211, an RF unit 221, and antennas 50(1) to 50(N) (where N is an integer equal or larger than one).

The baseband unit 211 includes a control circuit 212, a transmission processing circuit 213, a reception processing circuit 214, DA conversion circuits 215, 216, and AD conversion circuits 217, 218. The RF unit 221 and the baseband unit 211 may be collectively configured as one-chip IC (integrated circuit) or may be configured as independent chips.

As one example, the baseband unit 211 is a baseband LSI or a baseband IC. Alternatively, the baseband unit 211 may include an IC 232 and an IC 231 in the illustrated manner as indicated by dotted lines. In this context, components may be incorporated in a distributed manner on these ICs such that the IC 232 includes the control circuit 212, the transmission processing circuit 213, and the reception processing circuit 214 while the IC 231 includes the DA conversion circuits 215, 216 and the AD conversion circuits 217, 218. The control circuit 212, the transmission processing circuit 213, the reception processing circuit 214, or any combination thereof includes control circuitry.

The control circuit 212 is mainly configured to execute the functionality of the MAC processor 30 and 130 of FIGS. 6 and 7, etc. The functionality of the upper layer processor 40 and 140 may be included in the control circuit 112.

The transmission processing circuit 213 corresponds to the section that performs the processing before DA conversion processing in the transmitter 21 and 121 in FIGS. 6 and 7, etc. Specifically, the transmission processing circuit 213 mainly performs processing associated with the physical layer including addition of a preamble and a PHY header, encoding, modulation (which may include MIMO modulation), and generates, for example, two types of digital baseband signals (hereinafter referred to as the digital I-signal and Q-signal). It should be noted that another configuration can be contemplated according to which the functionality performed before DA conversion processing in the transmitter 21 and 121 of FIGS. 6 and 7, etc. may be included in the transmission processing circuit 213, the functionality performed after AD conversion processing in the receiver 22 and 122 may be included in the reception processing circuit 214.

The communication processing device of this embodiment corresponds, for example, to the control circuit 212, the transmission processing circuit 213, and the reception processing circuit 214. The communication processing device of this embodiment may take either configuration of a one-chip IC configuration or a multiple-chip IC configuration.

The DA conversion circuits 215 and 216 correspond to the section associated with the digital-to-analog conversion in the transmitter 21 and 121 of FIGS. 6 and 7, etc. The DA conversion circuits 215 and 216 are configured to perform digital-to-analog conversion for the signals input from the transmission processing circuit 213. More specifically, the DA conversion circuit 215 converts a digital I-signal into an analog I-signal, and the DA conversion circuit 216 converts a digital Q-signal into an analog Q-signal. It should be noted that there may be a case where the signals are transmitted as single-channel signals without the quadrature modulation being performed. In this case, it suffices that one single DA conversion circuit is provided. In addition, when transmission signals of one single channel or multiple channels are transmitted in a distributed manner in accordance with the number of antennas, DA conversion circuits may be provided in the number corresponding to the number of the antennas.

The RF unit 221, by way of example, is an RF analog IC or a high-frequency wave IC. The transmitting circuit 222 in the RF unit 221 corresponds to the section associated with the processing following the digital-to-analog conversion out of the functions of the transmitter 21 and 121 illustrated in FIGS. 6 and 7, etc. The transmitting circuit 222 includes a transmission filter that extracts a signal of a desired bandwidth from the signal of the frame that has been subjected to the digital-to-analog conversion by the DA conversion circuits 215 and 216, a mixer that performs up-conversion for the signal that has been subjected to the filtering to the wireless frequency using a signal having a predetermined frequency supplied from an oscillation device, a pre-amplifier (PA) that performs amplification for the signal that has been subjected to the up-conversion, and the like.

The receiving circuit 223 in the RF unit 221 corresponds to the section associated with the processing prior to the analog-to-digital conversion from among the functions of the receiver 22 and 122 illustrated in FIGS. 6 and 7, etc. The receiving circuit 223 includes an LNA (low noise amplifier) that amplifies the signal received by the antenna, a mixer that performs down-conversion of the amplified signal to the baseband using a signal having a predetermined frequency supplied from an oscillation device, a reception filter that extracts a signal of a desired bandwidth from the signal that has been subjected to the down-conversion, and the like. More specifically, the receiving circuit 223 performs quadrature demodulation for the reception signal, which has been subjected to the low noise amplification by a low noise amplifier, by carrier waves with 90 degree phase shift with respect to each other and thus generates an I-signal (In-phase signal) having the same phase as that of the reception signal and a Q-signal (Quad-phase signal) whose phase is delayed by 90 degrees with respect to the reception signal. The I-signal and the Q-signal are output from receiving circuit 223 after being subjected to the gain adjustment.

The control circuit 212 may control the operation of the transmission filter of the transmitting circuit 222 and the reception filter of the receiving circuit 223. Another controller that controls the transmitting circuit 222 and the receiving circuit 223 may be provided and the same or similar control may be realized by the control circuit 212 sending instructions to that controller.

The AD conversion circuits 217, 218 in the baseband unit 211 correspond to the section of the receiver 22 and 122 that performs the analog-to-digital conversion as illustrated in FIGS. 6 and 7, etc. The AD conversion circuits 217, 218 perform analog-to-digital conversion for the input signal that is input from the receiving circuit 223. More specifically, the AD conversion circuit 217 converts the I-signal into a digital I-signal and the AD conversion circuit 218 converts the Q-signal into a digital Q-signal. It should be noted that quadrature demodulation may not be performed and only a single-channel signal may be received. In this case, only one AD conversion circuit has to be provided. In addition, when a plurality of antennas are provided, AD conversion circuits in the number corresponding to the number of the antennas may be provided. The reception processing circuit 214 corresponds to the section that performs the processing following the AD conversion processing in the receiver 22 and 122 as illustrated in FIGS. 6 and 7, etc. Specifically, the reception processing circuit 214 performs demodulation processing for the signal that has been subjected to the analog-to-digital conversion, processing of removing the preamble and the PHY header, and the like processing, and delivers the frame that has been processed to the control circuit 212.

It should be noted that a switch may be arranged in the RF unit for switching the antennas 50(1) to 50(N) between the transmitting circuit 222 and the receiving circuit 223. By controlling the switch, the antennas 50(1) to 50(N) may be connected to the transmitting circuit 222 at the time of transmission and the antennas 50(1) to 50(N) may be connected to the receiving circuit 223 at the time of reception.

Although the DA conversion circuits 215, 2116 and the AD conversion circuits 217, 218 are arranged on the side of the baseband unit 211 in FIG. 20, another configuration may be adopted where they are arranged on the side of the RF unit 221.

It should be noted that the wireless communicator may be formed by the transmitting circuit 222 and the receiving circuit 223. The wireless communicator may be formed by further adding DAs 215, 216 and the DAs 217, 218 to the transmitting circuit 222 and the receiving circuit 223. The wireless communicator may be formed by including, along with these components, the PHY processing portions (i.e., the modulator and the demodulator) of the transmission processing circuit 213 and the reception processing circuit 214. Alternatively, the wireless communicator may be formed by the PHY reception processing portions of the transmission processing circuit 113 and the reception processing circuit 114.

Twelfth Embodiment

Figure 21:
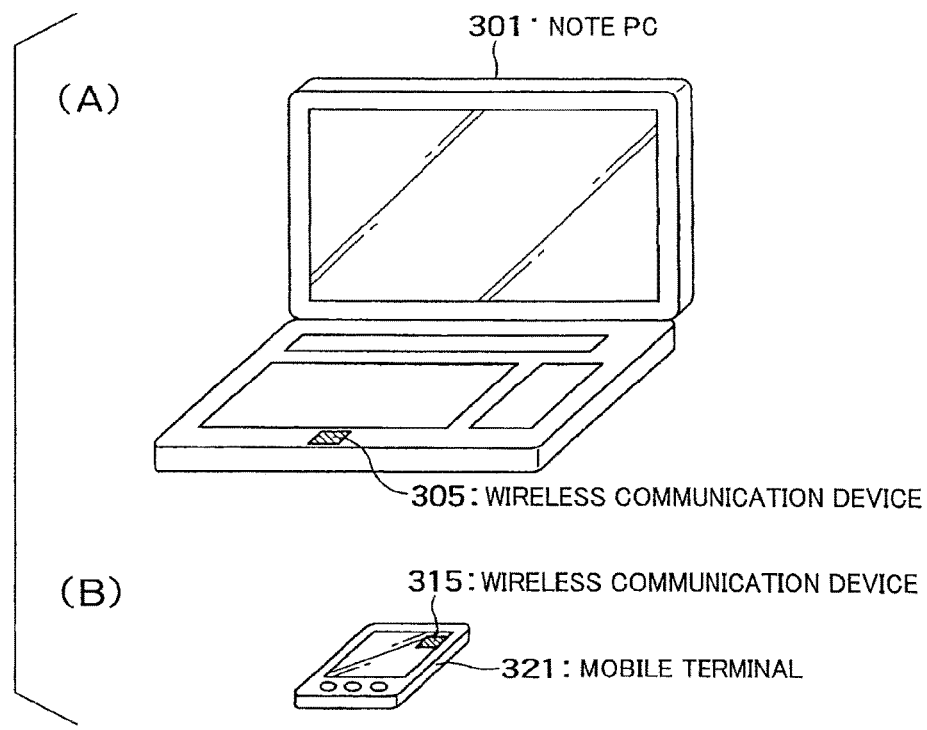
FIG. 21 is a perspective view of a wireless communication terminal according to a twelfth embodiment.

FIG. 21(A) and FIG. 21(B) are perspective views of a wireless communication terminal (wireless device) in accordance with a twelfth embodiment. The wireless device of FIG. 21(A) is a laptop PC 301 and the wireless device of FIG. 21(B) is a mobile terminal 321. They correspond, respectively, to one form of the terminal (which may operate as either the base station or the slave station). The laptop PC 301 and the mobile terminal 321 incorporate the wireless communication devices 305, 315, respectively. The wireless communication devices that are previously described may be used as the wireless communication devices 305, 315. The wireless device incorporating the wireless communication device is not limited to the laptop PC or the mobile terminal. For example, the wireless communication device may be incorporated in a television, digital camera, wearable device, tablet, smartphone, etc.

Figure 22:
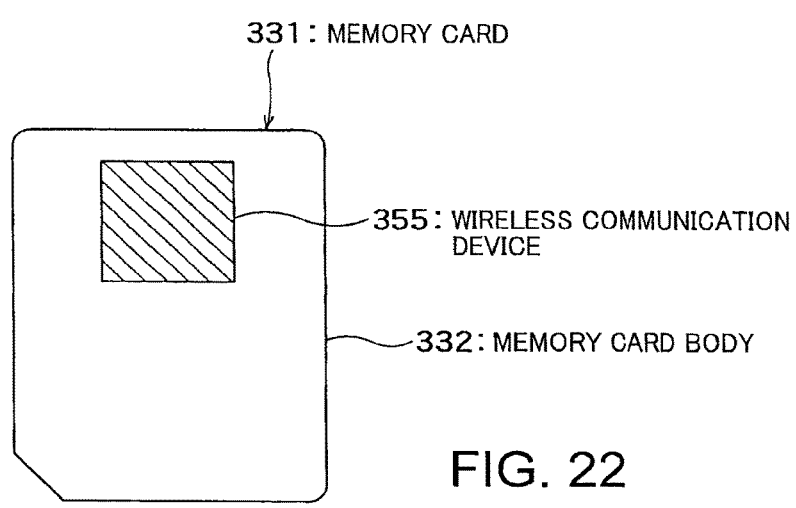
FIG. 22 is a diagram showing a memory card according to the twelfth embodiment.

In addition, the wireless communication device can be incorporated in a memory card. FIG. 22 illustrates an example where the wireless communication device is incorporated in the memory card. The memory card 331 includes a wireless communication device 355 and a memory card body 332. The memory card 331 uses the wireless communication device 335 for wireless communications with external devices. It should be noted that the illustration of the other elements in the memory card 331 (e.g., memory, etc.) is omitted in FIG. 22.

Thirteenth Embodiment

A thirteenth embodiment includes a bus, a processor, and an external interface in addition to the configuration of the wireless communication device in accordance with any one of the first to twelfth embodiments. The processor and the external interface are connected via the bus to the buffer. The firmware runs on the processor. In this manner, by providing a configuration where the firmware is included in the wireless communication device, it is made possible to readily modify the functionality of the wireless communication device by re-writing of the firmware.

Fourteenth Embodiment

An fourteenth embodiment includes a clock generator in addition to the configuration of the wireless communication device in accordance with any one of the first to twelfth embodiments. The clock generator is configured to generate a clock and output the clock on the output terminal and to the outside of the wireless communication device. In this manner, by outputting the clock generated within the wireless communication device to the outside thereof and causing the host side to operate based on the clock output to the outside, it is made possible to cause the host side and the wireless communication device side to operate in a synchronized manner.

Fifteenth Embodiment

A fifteenth embodiment includes a power source, a power source controller, and a wireless power supply in addition to the configuration of the wireless communication device in accordance with any one of the first to twelfth embodiments. The power source controller is connected to the power source and the wireless power supply, and is configured to perform control for selecting the power source from which power is supplied to the wireless communication device. In this manner, by providing a configuration where the power source is provided in the wireless communication device, it is made possible to achieve low power consumption operation accompanied by the power source control.

Sixteenth Embodiment

A sixteenth embodiment includes a SIM card in addition to the configuration of the wireless communication device in accordance with the fifteenth embodiment. The SIM card is connected, for example, to the MAC processor in the wireless communication device or to the control circuit 212, etc. In this manner, by providing a configuration where the SIM card is provided in the wireless communication device, it is made possible to readily perform the authentication processing.

Seventeenth Embodiment

A seventeenth embodiment includes a video compression/extension unit in addition to the configuration of the wireless communication device in accordance with the thirteenth embodiment. The video compression/extension unit is connected to a bus. In this manner, by configuring the video compression/extension unit included in the wireless communication device, it is made possible to readily perform transfer of the compressed video and the extension of the received compressed video.

Eighteenth Embodiment

A eighteenth embodiment includes an LED unit in addition to the configuration of the wireless communication device in accordance with any one of the first to twelfth embodiments. The LED unit is connected, for example, to the MAC processor in the wireless communication device, the transmission processing circuit 213, the reception processing circuit 214, or the control circuit 212, etc. In this manner, by providing a configuration where the LED unit is provided in the wireless communication device, it is made possible to readily notify the operating state of the wireless communication device to the user.

Nineteenth Embodiment

A nineteenth embodiment includes a vibrator unit in addition to the configuration of the wireless communication device in accordance with any one of the first to fifteenth embodiments. The vibrator unit is connected, for example, to the MAC processor in the wireless communication device, the transmission processing circuit 213, the reception processing circuit 214, or the control circuit 212, etc. In this manner, by providing a configuration in which the vibrator unit is provided in the wireless communication device, it is made possible to readily notify the operating state of the wireless communication device to the user.

Twentieth Embodiment

Figure 23:
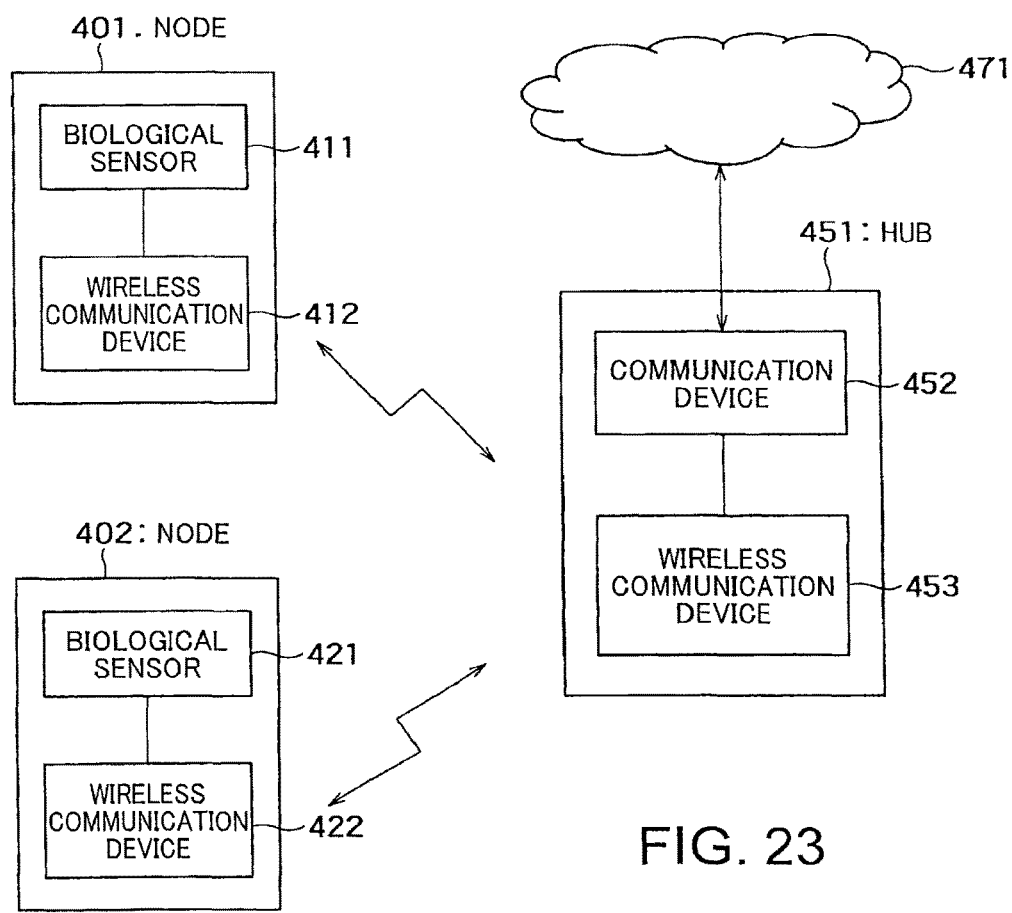
FIG. 23 is a diagram showing a wireless communication system according to a twentieth embodiment.

FIG. 23 illustrates an overall configuration of a wireless communication system in accordance with a twentieth embodiment. This wireless communication system is an example of the body area network. The wireless communication system includes a plurality of nodes including nodes 401, 402 and a hub 451. Each node and the hub are attached to the human body, and each node performs wireless communication with the hub 451. Being attached to the human body may refer to any case where it is arranged at a position near the human body such as a form in which it is in direct contact with the human body; a form in which it is attached thereto with clothes existing in between; a form in which it is provided on a strap hanging from the neck; and a form in which it is accommodated in a pocket. The hub 451 is, by way of example, a terminal including a smartphone, mobile phone, tablet, laptop PC, etc.

The node 401 includes a biological sensor 411 and a wireless communication device 412. As the biological sensor 411, for example, sensors may be used that are adapted to sense body temperature, blood pressure, pulse, electrocardiogram, heartbeat, blood oxygen level, urinal sugar, blood sugar, etc. Meanwhile, sensors adapted to sense biological data other than these may be used. The wireless communication device 412 is any one of the wireless communication devices of the embodiments that are described in the foregoing. The wireless communication device 412 performs wireless communication with the wireless communication device 453 of the hub 451. The wireless communication device 412 performs wireless transmission of the biological data (sensing information) sensed by the biological sensor 411 to the wireless communication device 453 of the hub 451. The node 401 may be configured as a device in the form of a tag.

The node 402 includes a biological sensor 421 and a wireless communication device 422. The biological sensor 421 and the wireless communication device 422, the explanations of which are omitted, are configured in the same or similar manner as the biological sensor 411 and the wireless communication device 412 of the node 401, respectively.

The hub 451 includes a communication device 452 and a wireless communication device 453. The wireless communication device 453 performs wireless communications with the wireless communication device of each node. The wireless communication device 453 may be the wireless communication device described in the context of the previous embodiments or may be another wireless communication device other than those described in the foregoing as long as it is capable of communications with the wireless communication device of the node. The communication device 452 is wire or wireless-connected to the network 471. The network 471 may be the Internet or a network such as a wireless LAN, or may be a hybrid network constructed by a wired network and a wireless network. The communication device 452 transmits the data collected by the wireless communication device 453 from the individual nodes to devices on the network 471. The delivery of data from the wireless communication device 453 to the communication devices may be performed via a CPU, a memory, an auxiliary storage device, etc. The devices on the network 471 may, specifically, be a server device that stores data, a server device that performs data analysis, or any other server device. The hub 451 may also incorporate a biological sensor in the same or similar manner as the nodes 401 and 402. In this case, the hub 451 also transmits the data obtained by the biological sensor to the devices on the network 471 via the communication device 452. An interface may be provided in the hub 451 for insertion of a memory card such as an SD card and the like and the data obtained by the biological sensor or obtained from each node may be stored in the memory card. In addition, the hub 451 may incorporate a user inputter configured to input various instructions by the user and a display for image display of the data, etc.

Figure 24:
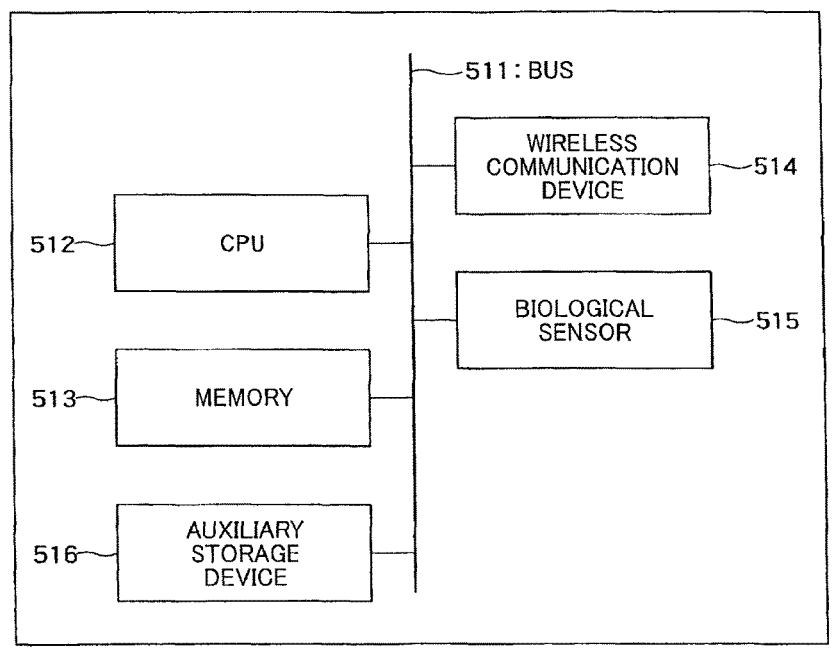
FIG. 24 is a hardware block diagram of the node according to the twentieth embodiment.

FIG. 24 is a block diagram illustrating a hardware configuration of the node 401 or node 402 illustrated in FIG. 23. The CPU 512, the memory 513, the auxiliary storage device 516, the wireless communication device 514, and the biological sensor 515 are connected to a bus 511. Here, the individual components 512 to 516 are connected to one single bus, but a plurality of buses may be provided by a chipset and the individual units 512 to 516 may be connected in a distributed manner to the plurality of buses. The wireless communication device 514 corresponds to the wireless communication devices 412, 422 of FIG. 23, and the biological sensor 515 corresponds to the biological sensor 411, 421 of FIG. 23. The CPU 512 controls the wireless communication device 514 and the biological sensor 515. The auxiliary storage device 516 is a device that permanently stores data such as an SSD, a hard disk, etc. The auxiliary storage device 516 stores a program to be executed by the CPU 512. In addition, the auxiliary storage device 516 may store data obtained by the biological sensor 515. The CPU 512 reads the program from the auxiliary storage device 516, develops it in the memory 513, and thus executes it. The memory 513 may be volatile memory such as DRAM, etc., or may be non-volatile memory such as MRAM, etc. The CPU 512 drives the biological sensor 515, stores data obtained by the biological sensor 515 in the memory 513 or the auxiliary storage device 516, and transmits the data to the hub via the wireless communication device 514. The CPU 512 may execute processing associated with communication protocols of layers higher than the MAC layer and processing associated with the application layer.

Figure 25:
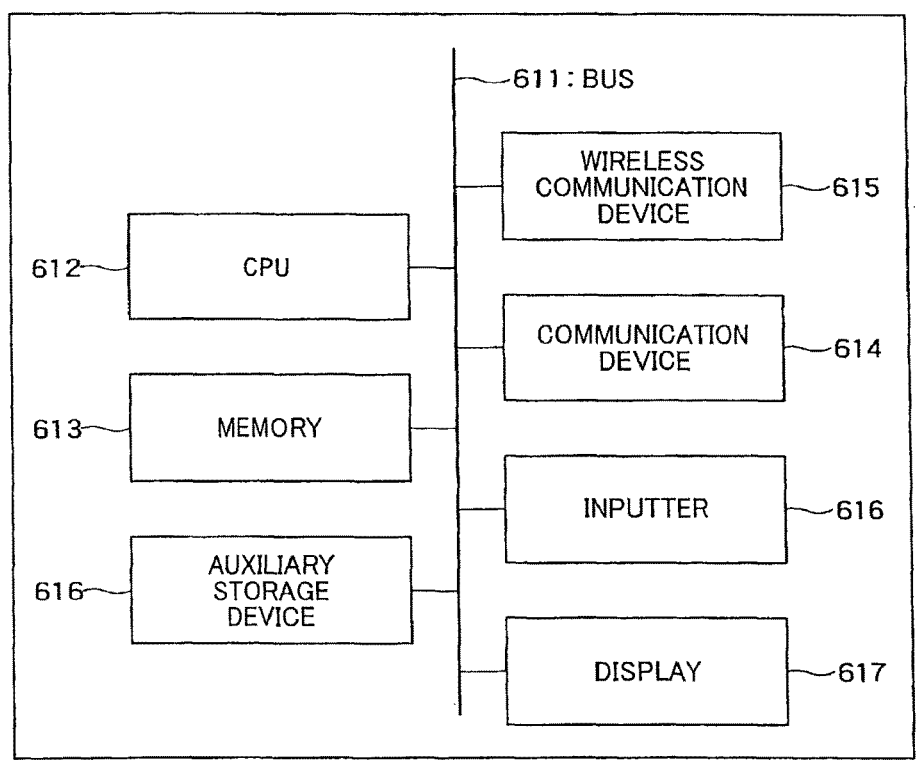
FIG. 25 is a hardware block diagram of the hub according to the twentieth embodiment.

FIG. 25 is a block diagram that illustrates a hardware configuration of the hub 451 illustrated in FIG. 23. A CPU 612, a memory 613, an auxiliary storage device 616, a communication device 614, a wireless communication device 615, an inputter 616 and a display 617 are connected to a bus 611. Here, the individual units 612 to 617 are connected to one single bus, but a plurality of buses may be provided by a chipset and the individual units 612 to 617 may be connected in a distributed manner to the plurality of buses. A biological sensor or a memory card interface may further be connected to the bus 611. The inputter 616 is configured to receive various instruction inputs from the user and output signals corresponding to the input instructions to the CPU 612. The display 617 provides image display of the data, etc. as instructed by the CPU 612. The communication device 614 and the wireless communication device 615 correspond to the communication device 452 and the wireless communication device 453 provided in the hub of FIG. 23, respectively. The CPU 612 controls the wireless communication device 615 and the communication device 614. The auxiliary storage device 616 is a device that permanently stores data such as an SSD, a hard disk, etc. The auxiliary storage device 616 stores a program executed by the CPU 612 and may store data received from each node. The CPU 612 reads the program from the auxiliary storage device 616, develops it in the memory 613, and executes it. The memory 613 may be volatile memory such as DRAM, etc., or may be non-volatile memory such as MRAM, etc. The CPU 612 stores data received by the wireless communication device 615 from each node in the memory 613 or the auxiliary storage device 616, and transmits the data to the network 471 via the communication device 614. The CPU 612 may execute processing associated with communication protocols of layers higher than the MAC layer and processing associated with the application layer.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. A wireless communication apparatus comprising:
    transmitting circuitry configured to:
        transmit a first beacon signal through a first channel, the first beacon signal including channel information of a second channel;
        transmit a second beacon signal through the second channel, the second beacon signal including an indication of a change of slot allocation in the second channel for a target communication apparatus if the change of slot allocation in the second channel is determined for the target communication apparatus; and
        transmit a third beacon signal through the second channel, the third beacon signal including an indication of an existence of data to be transmitted to the target communication apparatus if the data to be transmitted to the target communication apparatus exists; and
    receiver circuitry electrically coupled to the transmitting circuitry.

2. The wireless communication apparatus according to claim 1, wherein
    the receiving circuitry is further configured to receive a connection request from the target communication apparatus,
    time division multiple access in the second channel is used in a communication with the target communication apparatus, and
    the transmitting circuitry is further configured to transmit a connection response including information of an allocated slot to the target communication apparatus.

3. The wireless communication apparatus according to claim 1, wherein
    the transmitting circuitry is further configured to transmit a fourth beacon signal including information of a changed allocation slot to the target communication apparatus.

4. The wireless communication apparatus according to claim 1, wherein
    the transmitting circuitry is further configured to transmit information of a changed allocation slot, after the receiving circuitry receives signals including confirmation of the change of slot allocation from all of target communication apparatuses.

5. The wireless communication apparatus according to claim 1, wherein the transmitting circuitry is further configured to transmit a fifth beacon signal including identification of a slot allocated to other target communication apparatus in the second channel through the second channel.

6. The wireless communication apparatus according to claim 1, wherein a frequency band and an access scheme of the first channel is different from those of the second channel.

7. A wireless communication apparatus comprising:
    receiving circuitry configured to:
        receive a first beacon signal including channel information of a second channel through a first channel;
        receive a second beacon signal through the second channel specified in the channel information;
        receive a third beacon signal through the first channel, the third beacon signal including information of a changed allocation slot for the wireless communication apparatus; and
        receive a signal including data via a first slot through the second channel if the second beacon signal includes an indication of an existence of the data to be transmitted to the wireless communication apparatus; and
    transmitting circuitry electrically coupled to the receiving circuitry.

8. The wireless communication apparatus according to claim 7, wherein
    time division multiple access in the second channel is used in a communication with a target communication apparatus,
    the transmitting circuitry is configured to transmit a connection request to the target communication apparatus, and
    the receiving circuitry is configured to receive a connection response including information of an allocated slot from the target communication apparatus.

9. The wireless communication apparatus according to claim 8, wherein the third beacon signal includes information for notification of existence or non-existence of data to be transmitted to the wireless communication apparatus.

10. The wireless communication apparatus according to claim 8, wherein the receiving circuitry is configured to:
    receive a signal including information of the first slot from the target communication apparatus through the second channel after the receiving circuitry receives the third beacon signal; and specify the first slot based on the information included in the signal.

11. The wireless communication apparatus according to claim 8, wherein
the second beacon signal includes information including an indication of an existence of data to be transmitted to the wireless communication apparatus, and
the transmitting circuitry is configured to transmit a first signal including information indicating that the wireless communication apparatus confirmed the existence of the data to be transmitted to the wireless communication apparatus, through the second channel.

12. The wireless communication apparatus according to claim 11, wherein the receiving circuitry is configured to:
receive a second signal indicative of acknowledgement on the first signal from the target communication apparatus through the second channel, the second signal including information for specifying the first slot; and
specify the first slot based on the information included in the second signal.

13. The wireless communication apparatus according to claim 7, wherein a frequency band and an access scheme of the first channel is different from those of the second channel.

14. A wireless communication method comprising:
transmitting a first beacon signal through a first channel, the first beacon including channel information of a second channel;
transmitting a second beacon signal through the second channel, the second beacon signal including an indication of a change of slot allocation in the second channel for the target communication apparatus after the change of slot allocation in the second channel is determined for a target communication apparatus; and
transmitting a third beacon signal through the second channel, the third beacon signal including an indication of an existence of data to be transmitted to the target communication apparatus when the data to be transmitted to the target communication apparatus exists.

* * * * *